US008374632B2

(12) United States Patent
Ristich et al.

(10) Patent No.: US 8,374,632 B2
(45) Date of Patent: Feb. 12, 2013

(54) METHOD AND APPARATUS FOR PROVIDING GEO-LOCATION ENABLEMENT FOR WIRELESS DEVICE

(75) Inventors: Mark A. Ristich, Naperville, IL (US); David S. Benco, Winfield, IL (US)

(73) Assignee: Alcatel Lucent, Paris (FR)

( * ) Notice: Subject to any disclaimer, the term of this patent is extended or adjusted under 35 U.S.C. 154(b) by 158 days.

(21) Appl. No.: 12/651,583

(22) Filed: Jan. 4, 2010

(65) Prior Publication Data

US 2011/0165892 A1 Jul. 7, 2011

(51) Int. Cl.
*G01S 3/02* (2006.01)
(52) U.S. Cl. ....................... 455/456.2; 342/451
(58) Field of Classification Search ............... 455/456.2; 342/451
See application file for complete search history.

(56) References Cited

U.S. PATENT DOCUMENTS 7,298,327 B2 * 11/2007 Dupray et al. ............... 342/451

OTHER PUBLICATIONS

Day et al., A Model for Presence and Instant Messaging, RFC 2778, The Internet Society, Network Working Group, Feb. 2000, 17 pages.
Day et al., Instant Messaging/Presence Protocol Requirements, RFC 2779, The Internet Society, Network Working Group, Feb. 2000, 26 pages.
Sugano et al., Presence Information Data Format (PIDF), RFC 3863, The Internet Society, Network Working Group, Aug. 2004, 28 pages.
J. Peterson, A Present-Based GEOPRIV Location Object Format, RFC 4119, The Internet Society, Network Working Group, Dec. 2005, 24 pages.
J. Rosenberg, A Data Model for Presence, RFC 4479, The Internet Society, Network Working Group, Jul. 2006, 35 pages.

* cited by examiner

*Primary Examiner* — William D Cumming
(74) *Attorney, Agent, or Firm* — Fay Sharpe, LLP

(57) ABSTRACT

A method for providing geo-location enablement for a wireless device includes storing geo-location data in a storage device, the geo-location data including geo-location coordinates; referencing geo-location data for geo-location coordinates to corresponding wireless coverage area data, the wireless coverage area data for each geo-location coordinate including wireless coverage area coordinates, each wireless coordinate; representing a sub-area within a coverage area of a wireless network, each sub-area generally formed by an RF signaling range for a wireless access point; and referencing each wireless coordinate to corresponding signal strength data, the signal strength data for each wireless coordinate representing a signal strength value. Each signal strength value representing a signal strength parameter associated with the corresponding wireless coordinate. The wireless coverage area data and signal strength data being stored in the storage device. A server for providing geo-location enablement includes the storage device, an input module, and a geo-location handling module.

24 Claims, 11 Drawing Sheets

602 — RECEIVING GEO-LOCATION INFORMATION FROM A WIRELESS DEVICE WITHIN THE FIRST WIRELESS NETWORK VIA THE COMMUNICATION NETWORK, THE GEO-LOCATION INFORMATION COMPRISING GEO-LOCATION DATA, NETWORK LOCATION DATA, AND SIGNAL STRENGTH DATA, THE GEO-LOCATION DATA COMPRISING A GEO-LOCATION COORDINATE, THE NETWORK LOCATION DATA COMPRISING AT LEAST ONE NETWORK COORDINATE, THE SIGNAL STRENGTH DATA COMPRISING AT LEAST ONE SIGNAL STRENGTH VALUE CORRESPONDING TO THE AT LEAST ONE NETWORK COORDINATE

604 — STORING GEO-LOCATION COORDINATES FROM 602 IN THE STORAGE DEVICE AS GEO-LOCATION DATA UNLESS THE GEO-LOCATION DATA IN THE STORAGE DEVICE ALREADY INCLUDES THE GEO-LOCATION COORDINATE

606 — STORING NETWORK COORDINATES FROM 602 IN THE STORAGE DEVICE AS NETWORK LOCATION DATA AND REFERENCING EACH STORED NETWORK COORDINATE TO THE CORRESPONDING STORED GEO-LOCATION COORDINATE OF 604

608 — STORING SIGNAL STRENGTH VALUES FROM 602 IN THE STORAGE DEVICE AS SIGNAL STRENGTH DATA AND REFERENCING EACH STORED SIGNAL STRENGTH VALUE TO THE CORRESPONDING STORED NETWORK COORDINATE OF 606

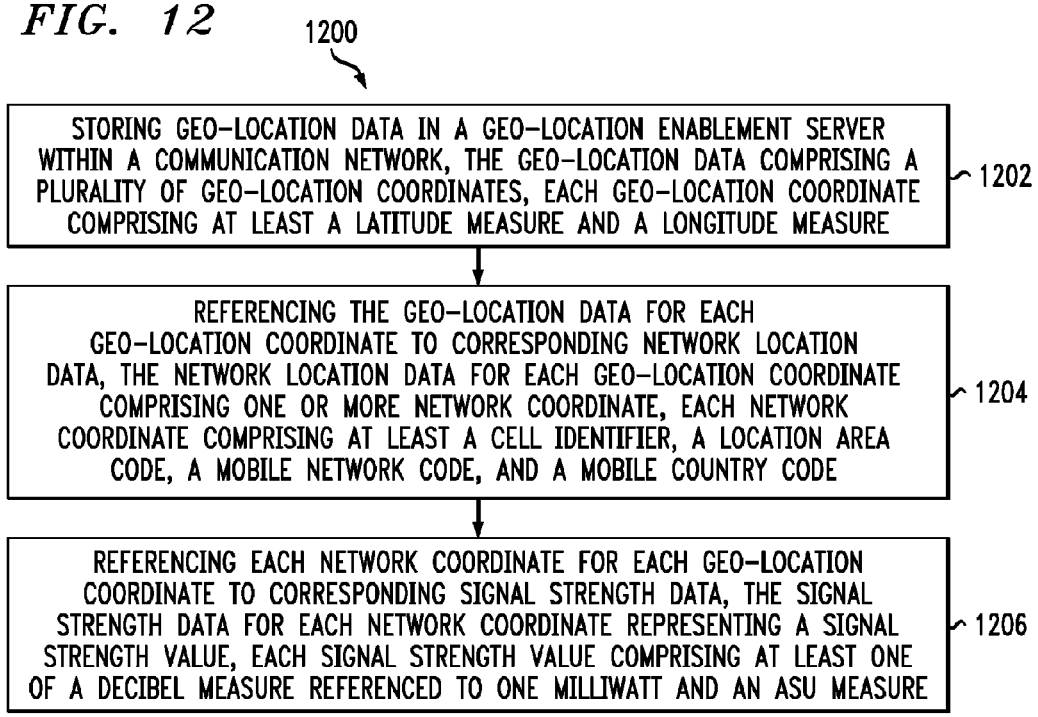
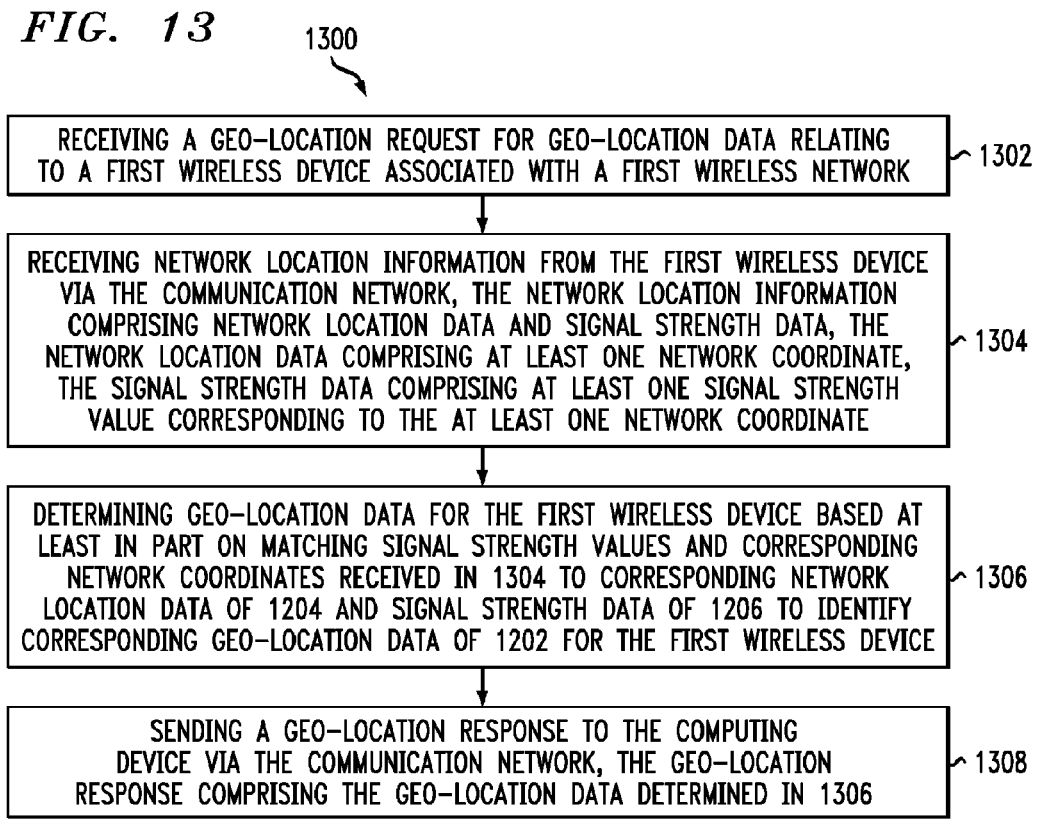

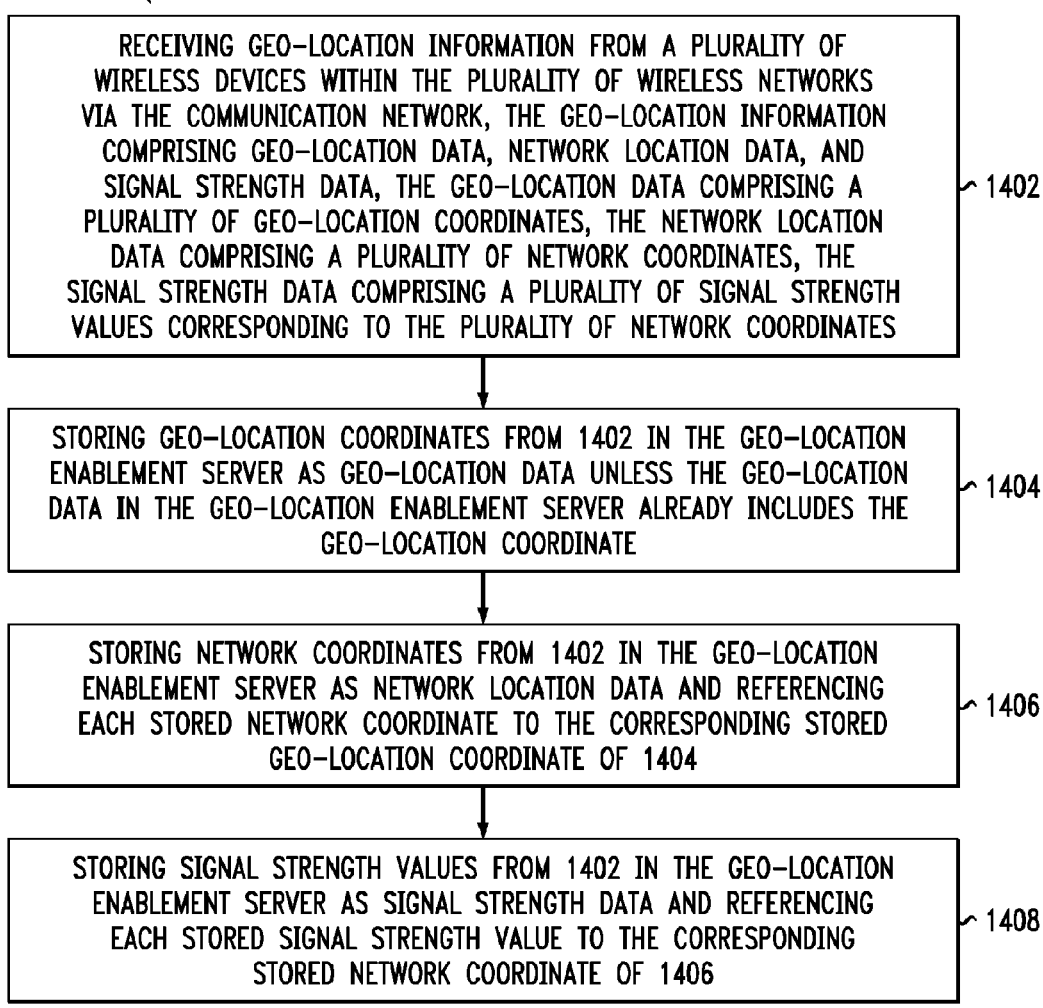

METHOD AND APPARATUS FOR PROVIDING GEO-LOCATION ENABLEMENT FOR WIRELESS DEVICE

BACKGROUND

This disclosure relates to a method and apparatus for geographical location (geo-location) enablement for a wireless device. For example, this disclosure describes exemplary embodiments for providing a mobile device that is not capable of otherwise determining its geo-location with the ability to do so through the use of a geo-location enablement server. This disclosure also describes exemplary embodiments for populating the geo-location enablement server leveraging, for example, a plurality of mobile devices that are cable of determining their own geo-location. Various exemplary embodiments of the geo-location enablement server are also described. While the invention is particularly directed to the art of geo-location enablement for mobile devices, and will be thus described with specific reference thereto, it will be appreciated that the invention may have usefulness in other fields and applications. For example, the invention may be used in various types of devices, including wireless user devices, autonomous wireless devices, and other devices with a wireless interface.

By way of background, current solutions to provide mobile location information to applications either require the mobile device (e.g., cellular phone) itself include a global positioning system (GPS) receiver and support for determining its location or require that the application provider request this information from applicable mobile operators for their subscribers that want to use their application. Not only do most emerging application providers not have the required relationships, but the expense associated with getting this information from incumbent operators may be prohibitive.

Since the telecommunications equipment required to provide the operator with highly accurate location information of their mobile subscribers resides on a radio access network overlay, it is quite expensive and operators may charge dearly for this information. For many location-based application providers, that fee may even prohibit the application from being offered.

Based on the foregoing, a solution that enables a simple, cost effective geo-location lookup for applications for wireless devices is desirable. Additionally, a solution that enables highly accurate geo-location lookup, such as GPS lookup, is desirable. These solutions would exploit geo-location enabled wireless devices to enable geo-location lookup for non-geo-location enabled wireless devices.

SUMMARY

In one aspect, a method for providing geo-location enablement for a wireless device is provided. In one embodiment, the method includes: a) storing geo-location data in a storage device within a communication network, the geo-location data comprising a plurality of geo-location coordinates; b) referencing the geo-location data for each geo-location coordinate to corresponding wireless coverage area identification data, the wireless coverage area identification data for each geo-location coordinate comprising one or more wireless coverage area coordinate, each wireless coverage area coordinate representing a different sub-area within a coverage area of a wireless network in the communication network, each sub-area based at least in part on an operative radio frequency (RF) signaling range for a wireless access point in the wireless network, wherein the wireless coverage area identification data is stored in the storage device; and c) referencing each wireless coverage area coordinate for each geo-location coordinate to corresponding signal strength data, the signal strength data for each wireless coverage area coordinate representing a signal strength value, each signal strength value representing a signal strength parameter associated with the corresponding wireless coverage area coordinate in relation to the corresponding geo-location coordinate, wherein the signal strength data is stored in the storage device.

In another aspect, an apparatus for providing geo-location enablement for a wireless device is provided. In one embodiment, the apparatus includes: an input module for receiving geo-location information via a communication network, the geo-location information comprising geo-location data, wireless coverage area identification data, and signal strength data; a geo-location handling module in operative communication with the input module for processing the geo-location data, wireless coverage area identification data, and signal strength data; and a storage device in operative communication with the geo-location handling module for storing the geo-location data, wireless coverage area identification data, and signal strength data, the geo-location data comprising a plurality of geo-location coordinates. The geo-location data for each geo-location coordinate is referenced to corresponding wireless coverage area identification data.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 6, in conjunction with FIG. 4, is a flow chart of yet another exemplary embodiment of a process for providing geo-location enablement for a wireless device;

FIG. 12 is a flow chart of still another exemplary embodiment of a process for providing geo-location enablement for a wireless device;

FIG. 13, in conjunction with FIG. 12, is a flow chart of still yet another exemplary embodiment of a process for providing geo-location enablement for a wireless device; and FIG. 14, in conjunction with FIG. 12, is a flow chart of another exemplary embodiment of a process for providing geo-location enablement for a wireless device.

DETAILED DESCRIPTION

Various embodiments of methods and apparatus for providing geo-location enablement for a wireless device are disclosed herein. In one embodiment, a method for providing geo-location enablement using a storage device having geo-location data, wireless coverage area ID data, and signal strength data stored therein. In another embodiment, an apparatus including the storage device server is provided.

While wireless telephony terms and equipment may be used herein for the description and examples, the concepts defined herein are equally applicable to all modalities of wireless access. For example, the various embodiments disclosed herein may be implemented using wireless (e.g., satellite, cellular, WiFi (such as IEEE 802.11), WIMAX® wireless access (such as IEEE 802.16), etc.), instant messaging service, text messaging service (e.g., short messaging service (SMS)), e-mail service, internet protocol (IP) communications, voice over IP (VoIP) communications, multimedia communications, and other access methodologies, including future access methodologies. WIMAX® is a registered trademark of WiMAX Forum, San Diego, Calif.

There are currently multiple methods for obtaining and using mobile location information in a telecommunications network. However, with the advent of programmable mobile clients, advantage can now be taken advantage of capabilities on one type of mobile device to help supplement the lack of those capabilities on another. This solves problems of how to offer highly accurate location information to mobile applications for mobile devices that do not support GPS and, without the mobile application needing to interface with carriers to obtain that information from the carrier directly either (e.g. via gateway mobile location centers (GMLC), etc.).

In one embodiment, GPS-enabled mobile devices may be leveraged using a WEB 2.0-based solution. For example, the existence of open and programmable mobile clients on both GPS enabled and non-GPS enabled mobile devices may be leveraged in a WEB 2.0 sense. With enhancements to the existing presence information standards, additional information can be exchanged between the mobile clients and a network element responsible for keeping track of mobile location. This may be done on a latitude/longitude basis. The network element may be a location enabling server.

Figure 1:
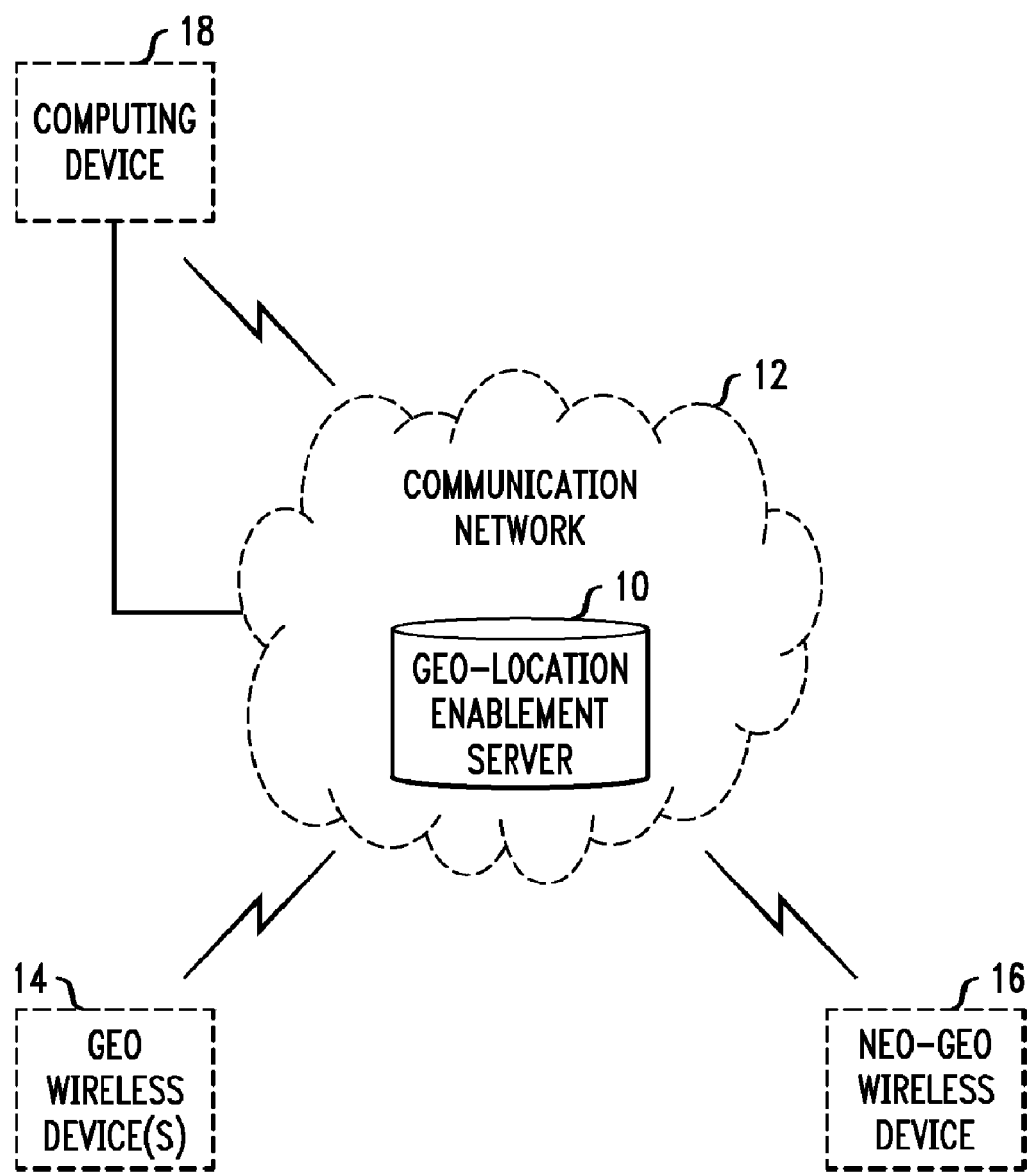
FIG. 1 is a block diagram of an exemplary embodiment of a geo-location enablement server in a communication network.

Referring now to the drawings wherein the showings are for purposes of illustrating the exemplary embodiments only and not for purposes of limiting the claimed subject matter, FIG. 1 depicts an exemplary embodiment of a geo-location enablement server 10 within a communication network 12. Geo-wireless device(s) 14, non-geo wireless device 16, and computing device 18 are in operative communication with the geo-location enablement server 10 via the communication network 12.

The geo-wireless device(s) 14 may include mobile devices that support GPS. The geo-wireless device(s) 14 may send latitude and long information, as determined by the GPS capability, to the geo-location enablement server 10, along with the corresponding serviceState and signalStrength information for each wireless access point in the communication network 12 that the corresponding geo-wireless device(s) 14 is exchanging RF signaling information. The latitude and longitude information may also be referred to as geo-location data. The serviceState information may also be referred to as wireless coverage area information or network cell information that uniquely identifies the corresponding wireless access point. The signalStrength information may also be referred to as signal strength data associated with the corresponding wireless access point. The serviceState and signalStrength information together with the associated geo-location information may be used to create a map of the location of the various operators' wireless access points (e.g., cell towers, base stations, etc.) which is enhanced by the actual RF signal strength measurements. The map is based on the accompanying latitude and longitude information.

Then, when an application for a non-geo wireless device 16 (e.g., non-GPS mobile) requires location information, the non-geo wireless device 16 need only send its serviceState and signalStrength information. The geo-location enablement server 10 can match the serviceState and signalStrength information to the nearest corresponding latitude and longitude information. The application requesting the location information for the non-geo wireless device 16 may run on the non-geo wireless device 16, on the computing device 18, or on another application server. The application requesting the location information could even be running on the geo-location enablement server 10 for some embodiments.

The various embodiments described herein include enhancements to existing presence information standards, such as Request for Comments (RFC) 3863 Presence Information Data Format (PIDF), RFC 4119 A Presence-based Geographical Location/Privacy (GEOPRIV) Location Object Format, and RFC 4479 a Data Model for Presence.

RFC 3863 specifies the common profile for presence (CPP) PIDF as a common presence data format for CPP-compliant presence protocols and also defines an "application/pidf+xml" media type to represent the extensible markup language (XML) multipurpose internet mail extension (MIME) entity for PIDF. The format specified RFC 3863 defines the base presence format and extensibility required by RFC 2779 Instant Messaging/Presence Protocol (IMPP) Requirements. RFC 3863 defines a minimal set of presence status values defined by RFC 2778 A Model for Presence and Instant Messaging.

RFC 4119 describes an object format for carrying geographical information on the Internet. This location object extends PIDF, which was designed for communicating privacy-sensitive presence information and which has similar properties.

RFC 4479 defines the underlying presence data model used by session initiation protocol (SIP) for instant messaging and presence leveraging extensions (SIMPLE) presence agents. The data model provides guidance on how to map various communications systems into presence documents in a consistent fashion.

GEOPRIV (RFC 4119) extended PIDF to add latitude and longitude information to allow mobiles that support GPS to send their location to applications that require it. However, wireless devices (e.g., mobile devices) that don't support geo-location information (e.g., GPS) cannot currently use applications that use latitude and longitude information. In various embodiments described herein, wireless devices that don't support geo-location information may use applications that incorporate geo-location data if the presence schema is extended to include, for example, network ID, cell ID, and RF strength information. Under the extended presence schema, wireless devices that support geo-location information can be leveraged by the geo-location enablement server 10 to offer generally equivalent capabilities to wireless devices that do not support geo-location information.

In one embodiment, the presence data model of RFC 4479 can be extended. For example, the XML schema can be extended to include serviceState and signalStrength information. As shown below, the serviceState and signalStrength information may be included in the data-model-rfc4479.xsd. However, the serviceState and signalStrength information could have just as easily been included in a number of other structures. Similarly, the data organization in the exemplary extensions of RFC 4479 could have just as effectively been done differently. In other words, the serviceState and signalStrength information and the resulting capabilities provide the geo-location enablement described herein regardless of specific scheme or structures used to implement the serviceState and signalStrength information.

data-model-rfc4479.xsd

```
<?xml version="1.0" encoding="UTF-8"?>
<xs:schema targetNamespace="urn:ietf:params:xml:ns:pidf:data-model"
 xmlns:xs="http://www.w3.org/2001/XMLSchema"
 xmlns="urn:ietf:params:xml:ns:pidf:data-model"
 elementFormDefault="qualified" attributeFormDefault="unqualified">
  <!-- BEGIN include common-schema-07.xsd-->
  <xs:import namespace="http://www.w3.org/XML/1998/namespace" />
  <xs:simpleType name="Timestamp_t">
    <xs:annotation>
      <xs:documentation>Timestamp type</xs:documentation>
    </xs:annotation>
    <xs:restriction base="xs:dateTime" />
  </xs:simpleType>
  <xs:simpleType name="deviceID_t">
    <xs:annotation>
      <xs:documentation>Device ID, a URN</xs:documentation>
    </xs:annotation>
    <xs:restriction base="xs:anyURI" />
  </xs:simpleType>
  <xs:complexType name="Note_t">
    <xs:annotation>
      <xs:documentation>Note type</xs:documentation>
    </xs:annotation>
    <xs:simpleContent>
      <xs:extension base="xs:string">
        <xs:attribute ref="xml:lang" />
      </xs:extension>
    </xs:simpleContent>
  </xs:complexType>
  <xs:attributeGroup name="fromUntil">
    <xs:attribute name="from" type="xs:dateTime" />
    <xs:attribute name="until" type="xs:dateTime" />
  </xs:attributeGroup>
  <xs:complexType name="empty" />
  <!-- END include common-schema-07.xsd-->
  <xs:element name="deviceID" type="deviceID_t">
    <xs:annotation>
      <xs:documentation>Device ID, a URN</xs:documentation>
    </xs:annotation>
  </xs:element>
  <xs:element name="device">
    <xs:annotation>
      <xs:documentation>Contains information about the device</xs:documentation>
    </xs:annotation>
    <xs:complexType>
      <xs:sequence>
        <xs:any namespace="##other" processContents="lax" minOccurs="0" maxOccurs="unbounded" />
        <xs:element ref="deviceID" />
        <xs:element name="note" type="Note_t" minOccurs="0" maxOccurs="unbounded" />
        <xs:element name="timestamp" type="Timestamp_t" minOccurs="0" />
      </xs:sequence>
      <xs:attribute name="id" type="xs:ID" use="required" />
    </xs:complexType>
  </xs:element>
  <xs:element name="person">
    <xs:annotation>
      <xs:documentation>Contains information about the human user</xs:documentation>
    </xs:annotation>
    <xs:complexType>
      <xs:sequence>
        <xs:any namespace="##other" processContents="lax" minOccurs="0" maxOccurs="unbounded">
          <xs:annotation>
            <xs:documentation>Characteristic and status information</xs:documentation>
          </xs:annotation>
        </xs:any>
        <xs:element name="note" type="Note_t" minOccurs="0" maxOccurs="unbounded" />
        <xs:element name="timestamp" type="Timestamp_t" minOccurs="0" />
      </xs:sequence>
      <xs:attribute name="id" type="xs:ID" use="required" />
    </xs:complexType>
  </xs:element>
  <!-- END include data-model-rfc4479.xsd-->
  <xs:complexType name="serviceState_t">
    <xs:sequence>
      <xs:any namespace="##other" processContents="lax" minOccurs="0" maxOccurs="unbounded">
        <xs:annotation>
          <xs:documentation>Information about serving base station and network</xs:documentation>
        </xs:annotation>
      </xs:any>
      <xs:element name="cid" type="xs:int" minOccurs="1" maxOccurs="1" />
      <xs:element name="lac" type="xs:int" minOccurs="1" maxOccurs="1" />
      <xs:element name="mnc" type="xs:string" minOccurs="1" />
      <xs:element name="mcc" type="xs:string" minOccurs="1" />
    </xs:sequence>
  </xs:complexType>
  <xs:complexType name="signalStrength_t">
    <xs:sequence>
      <xs:any namespace="##other" processContents="lax" minOccurs="0" maxOccurs="unbounded">
        <xs:annotation>
          <xs:documentation>Information about base station signal strength</xs:documentation>
        </xs:annotation>
      </xs:any>
      <xs:element name="dBm" type="xs:negativeInteger" minOccurs="0" maxOccurs="1" />
      <xs:element name="ASU" type="xs:unsignedInt" minOccurs="0" maxOccurs="1" />
    </xs:sequence>
  </xs:complexType>
  <xs:element name="mobility">
    <xs:annotation>
      <xs:documentation>Contains network ID and signal strength information</xs:documentation>
    </xs:annotation>
    <xs:complexType>
      <xs:sequence>
        <xs:any namespace="##other" processContents="lax" minOccurs="0" maxOccurs="unbounded">
```

```
        <xs:annotation>
            <xs:documentation>Information about base station signal
strength</xs:documentation>
        </xs:annotation>
    </xs:any>
    <xs:element name="serviceState" type="serviceState_t"
minOccurs="0" maxOccurs="1" />
    <xs:element name="signalStrength" type="signalStrength_t"
minOccurs="0" maxOccurs="1" />
        </xs:sequence>
        <xs:attribute name="id" type="xs:ID" use="required" />
    </xs:complexType>
    </xs:element>
</xs:schema>
```

Example SIP Message

```
<!--
    DEBUG/UDPListeningPointImpl(780): Packet java.net.DatagramPacket@40291938
received, length = 325
    DEBUG/UDPListeningPointImpl(780): Processing point #1
    DEBUG/UDPListeningPointImpl(780): Processing packet
java.net.DatagramPacket@40291938
    DEBUG/SipClient(780):
===========================================================
    Incoming SIP Message
    DEBUG/SipClient(780): SIP/2.0 200 OK
    DEBUG/SipClient(780): CSeq: 30 PUBLISH
    DEBUG/SipClient(780): To: <sip:mark@halo.ih.lucent.com>
        ;tag=0011110ed86b-2610136487-28-fmfj6t
    DEBUG/SipClient(780): Expires: 1800
    DEBUG/SipClient(780): Via: SIP/2.0/UDP
127.0.0.1:5070;branch=z9hG4bK37b237e5-1e;received=135.244.0.152
    DEBUG/SipClient(780): From: <sip:mark@halo.ih.lucent.com>
        ;tag=regtag30
    DEBUG/SipClient(780): Call-ID: 7f200ee4@10.0.2.15
    DEBUG/SipClient(780): SIP-ETag: -1612896735
    DEBUG/SipClient(780): Content-Length: 0
    DEBUG/SipClient(780):
    Outgoing SIP Message
    DEBUG/SipClient(780): PUBLISH sip:mark@halo.ih.lucent.com SIP/2.0
    DEBUG/SipClient(780): Max-Forwards: 70
    DEBUG/SipClient(780): Via: SIP/2.0/UDP
127.0.0.1:5070;branch=z9hG4bK7d99b6f6-1f
    DEBUG/SipClient(780): CSeq: 31 PUBLISH
    DEBUG/SipClient(780): Call-ID: 7f200ee4@10.0.2.15
    DEBUG/SipClient(780): From: <sip:mark@halo.ih.lucent.com>
        ;tag=regtag31
      DEBUG/SipClient(780): To: <sip:mark@halo.ih.lucent.com>
        DEBUG/SipClient(780): Content-Type: application/pidf+xml
        DEBUG/SipClient(780): Content-Length: 1819
        DEBUG/SipClient(780): Expires: 1800
        DEBUG/SipClient(780): Event: presence
        DEBUG/SipClient(780): SIP-If-Match: -1612896735
        DEBUG/SipClient(780):
        DEBUG/SipClient(780):
-->
<?xml version="1.0" encoding="UTF-8"?>
            <pr:presence  xmlns:pr="urn:ietf:params:xml:ns:pidf"
                          xmlns:r="urn:ietf:params:xml:ns:pidf:rpid"
                          xmlns:pdm="urn:ietf:params:xml:ns:pidf:data-model-
rfc4479-ext"
                          xmlns:c="urn:ietf:params:xml:ns:pidf:caps"
                          xmlns:gp="urn:ietf:params:xml:ns:pidfgeopriv10"
                          xmlns:gml="urn:opengis:specification:gml:schema-
xsd:feature:v3.0"
                    entity="sip:mark@halo.ih.lucent.com">
            <pr:tuple id="t11">
                <pr:status>
                    <gp:geopriv>
                        <gp:location-info>
                            <gml:location>
                                <gml:Point gml:id="point1" srsName="epsg:4326">
                                    <gml:coordinates>37.0:25.0:18.83731387675607N -
122.0:6.0:4.171617622429267W</gml:coordinates>
                                </gml:Point>
                            </gml:location>
                        </gp:location-info>
                        <gp:usage-rules>
                            <gp:retransmission-allowed>no</gp:retransmission-
allowed>
                            <gp:retention-expiry>2009-05-
06T07:17:04Z</gp:retention-expiry>
                        </gp:usage-rules>
```

-continued

```
        </gp:geopriv>
      </pr:status>
      <pdm:deviceID>mac:8asd7d7d70</pdm:deviceID>
      <c:servcaps>
        <c:methods>
          <c:method>MESSAGE</c:method>
          <c:method>OPTIONS</c:method>
        </c:methods>
      </c:servcaps>
      <pr:contact>sip:mark@halo.ih.lucent.com</pr:contact>
      <pr:timestamp>2008-05-06T07:17:04Z</pr:timestamp>
    </pr:tuple>
    <pr:tuple id="t12">
      <pr:status>
        <pr:basic>open</pr:basic>
      </pr:status>
      <pdm:deviceID>mac:8as222222</pdm:deviceID>
      <c:servcaps>
        <c:methods>
          <c:method>MESSAGE</c:method>
          <c:method>OPTIONS</c:method>
        </c:methods>
      </c:servcaps>
      <pr:contact>sip:mark@halo.ih.lucent.com</pr:contact>
      <pr:timestamp>2008-05-06T07:17:04Z</pr:timestamp>
    </pr:tuple>
    <pdm:person id="first">
      <pr:status>
        <r:activities>
          <r:on-the-phone/>
          <r:busy/>
        </r:activities>
      </pr:status>
      <r:sphere>maison</r:sphere>
      <pdm:timestamp>2008-05-06T07:17:04Z</pdm:timestamp>
    </pdm:person>
    <pdm:device id="mac8asd7d7d70">
      <r:user-input>idle</r:user-input>
      <pdm:deviceID>mac8970</pdm:deviceID>
      <pdm:timestamp>2008-05-06T07:17:04Z</pdm:timestamp>
    </pdm:device>
    <pdm:mobility id='someID'>
      <pdm:serviceState>
        <pdm:cid>11</pdm:cid>
        <pdm:lac>22</pdm:lac>
        <pdm:mnc>33</pdm:mnc>
        <pdm:mcc>44</pdm:mcc>
      </pdm:serviceState>
      <pdm:signalStrength>
        <pdm:dBm>-55</pdm:dBm>
        <pdm:ASU>66</pdm:ASU>
      </pdm:signalStrength>
    </pdm:mobility>
  </pr:presence>
```

Using the serviceState and signalStrength information along with the existing pidfgeopriv extension (RFC 4119), which added latitude and longitude information, the various methods and apparatus described therein provide a location enabler to, for example, non-GPS enabled mobiles that inexpensively supports location services without integrating with any operator's GMLC.

The geo-location enablement described herein may be viewed as a new paradigm for providing location information to applications from mobiles that don't directly support geo-location (e.g., GPS), but do support an open programmable client (e.g., ANDROID® mobile device), without needing to access equivalent location information from their respective mobile operators. This may save on cost and may allow application providers to support a larger number of mobile devices then would otherwise be possible. Of course, client applications that support the geo-location enablement described herein could also be embedded in mobile devices. Therefore, even non-programmable or proprietary mobile devices could make use of geo-location enablement described herein. ANDROID® is a registered trademark of Google, Inc., Mountain View, Calif.

The geo-location enablement described herein may be viewed as a strategic initiative for advancement of applications over the top (OTT) of broadband communication and particularly advancement of OTT application service enablement. Moreover, the geo-location enablement described herein may optimize interpretation of cell ID/RF strength-to-location mapping through client input. This may provide a cost effective way for OTT service providers to grow their user base to include non-GPS enabled mobiles that support an open programmable client. The alternative of going to the mobile service providers for such information can be cost prohibitive, thus limiting potentially innovative and desirable applications.

The geo-location enablement described herein may implemented in 3G, 4G, and other wireless networks that support broadband communication, including code division multiple access (CDMA), global system for mobile communications (GSM), universal mobile telephone system (UMTS), and long term evolution (LTE). Therefore, the geo-location enablement concepts disclosed herein may be useful to wireless operators and OTT service providers that make use of geo-location information. Certain geo-location enablement concepts described were demonstrated under laboratory conditions using the Alcatel-Lucent, model IAS 5350 presence application server.

Figure 2:
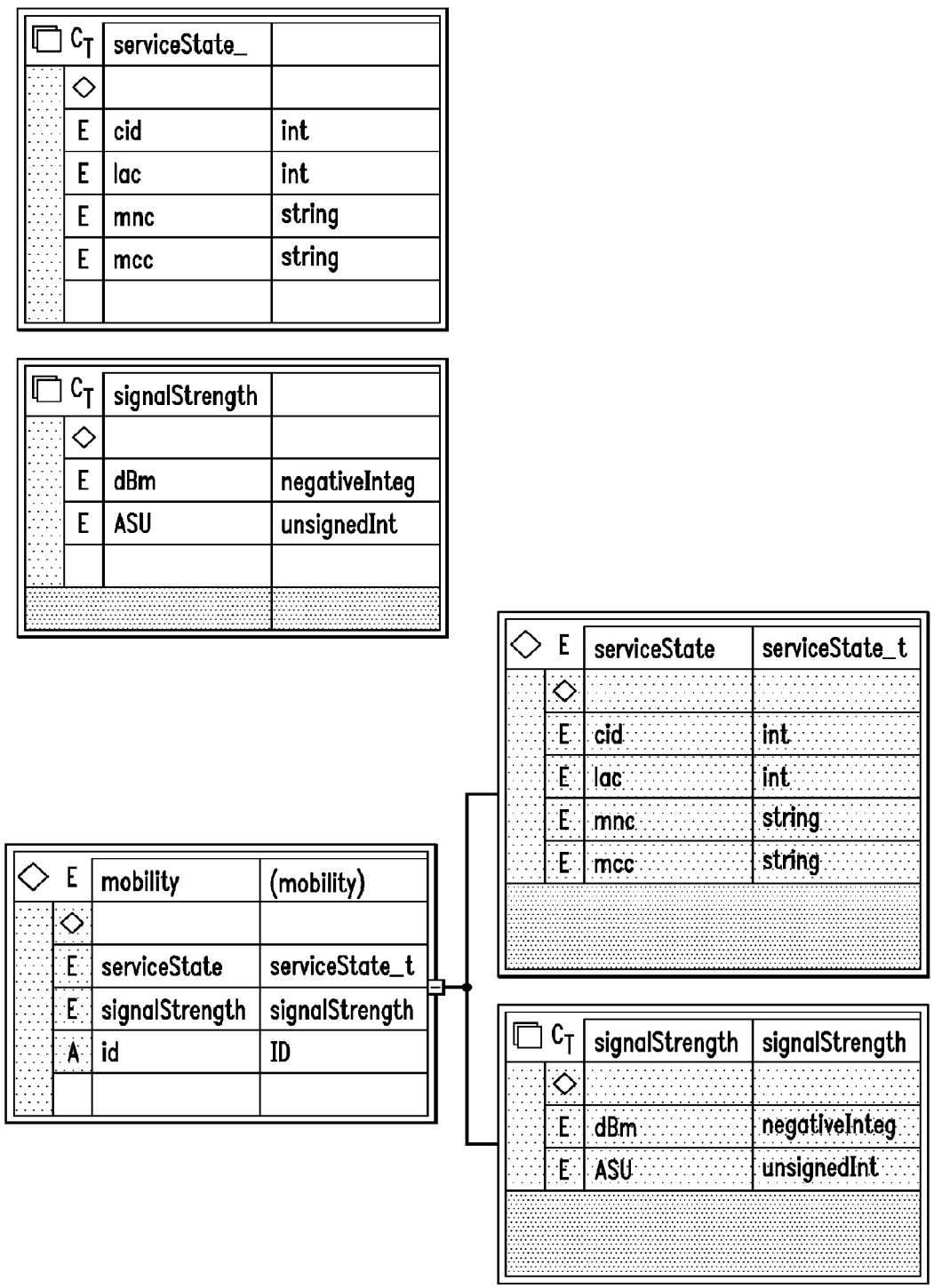
FIG. 2 is a diagram showing an exemplary embodiment of wireless coverage area identification (ID) data and signal strength data associated with providing geo-location enablement for a wireless device.

As discussed above, the schema of the presence data model of RFC 4479 may be extended to include network ID, cell ID and signal strength when providing presence information. This is just one exemplary embodiment for implementing the geo-location enablement concepts disclosed herein. In the extensions to the presence data model, a mobility object may be defined as a complex type consisting of a serviceState object and a signalStrength object. For example, this may be loosely based on the attributes retrievable using the open mobile client application program interface (API) (e.g., ANDROID® open mobile client API), but in such a manner as to be flexible for other Smartphone platforms as well. A visual depiction of these exemplary objects is shown in FIG. 2. This permits use of WEB 2.0 user-provided location information enablement for non-GPS mobiles. ANDROID® is a registered trademark of Google, Inc., Mountain View, Calif.

Figure 3:
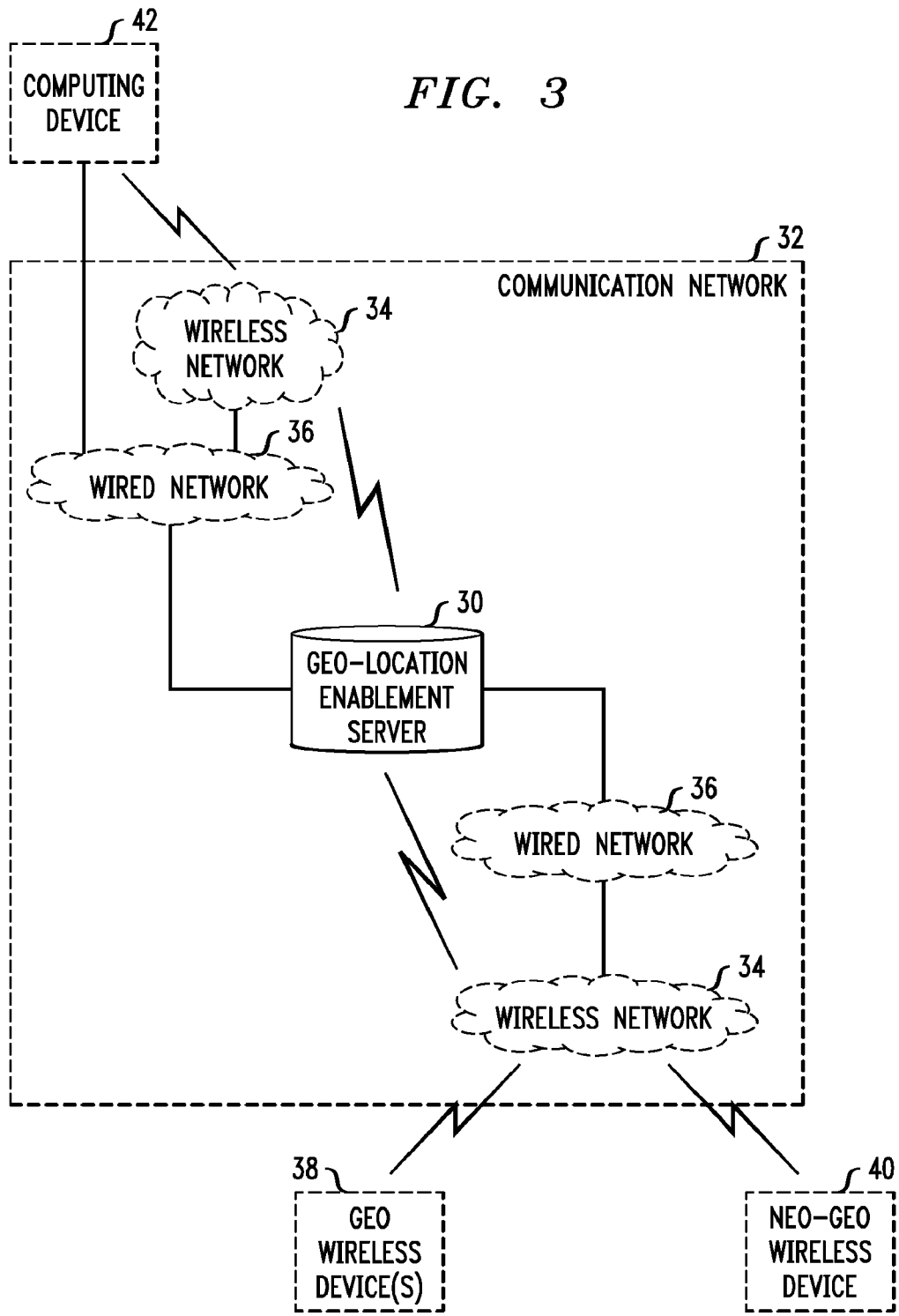
FIG. 3 is a block diagram of another exemplary embodiment of a geo-location enablement server in a communication network.

With reference to FIG. 3, another exemplary embodiment of a geo-location enablement server 30 is shown in a communication network 32 that includes a plurality of wireless networks 34 and a plurality of wired networks 36. As depicted, the communication network 32 can be comprised of any combination of any type of wireless and wired networks, including a public switched telephone network (PSTN), a wireless telephone network, a cellular telephone network, a satellite telephone network, an IP network, a VoIP network, a local area network (LAN), a wide area network (WAN), a metropolitan area network (MAN), or any other suitable type of wired or wireless network in any suitable combination.

One or more geo wireless device 38 may be in communication with the geo-location enablement server 30 via wireless network 34 or a combination of wireless network 34 and wired network 36. Each geo wireless device 38 may provide corresponding geo-location data, wireless coverage area ID data, and signal strength data to the geo-location server 30 either automatically, in response to user interaction, or in response to requests for such information.

A non-geo wireless device 40 may be in communication with the geo-location enablement server 30 via wireless network 34 or a combination of wireless network 34 and wired network 36. In one embodiment, the non-geo wireless device 40 may send a request for geo-location data to the geo-location enablement server 30 along with corresponding wireless coverage area ID data and signal strength data either automatically or in response to user interaction. In this embodiment, the geo-enablement server 30 may determine the corresponding geo-location data for the non-geo wireless device 40 based on the wireless coverage area ID and corresponding signal strength data and send a response to the non-geo wireless device 40 with the determined geo-location data.

A computing device 42 may be in communication with the geo-location enablement server 30 via wireless network 34 or a combination of wireless network 34 and wired network 36. In one embodiment, the computing device 42 may send a request for geo-location data for the non-geo wireless device 40 to the geo-location enablement server 30. In this embodiment, the non-geo wireless device 40 may send wireless coverage area ID data and signal strength data either automatically, in response to interaction with the computing device 42, or in response to interaction with the geo-location enablement server 30. The geo-enablement server 30 may determine the corresponding geo-location data for the non-geo wireless device 40 based on the wireless coverage area ID and corresponding signal strength data and send a response to the computing device 42 with the determined geo-location data.

Figure 4:
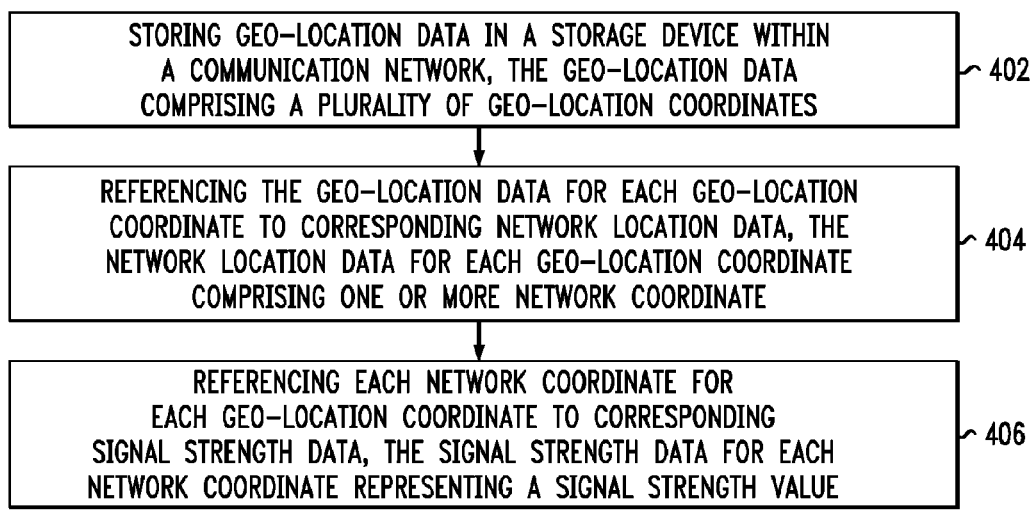
FIG. 4 is a flow chart of an exemplary embodiment of a process for providing geo-location enablement for a wireless device.

With reference to FIG. 4, an exemplary embodiment of a process 400 for providing geo-location enablement for a wireless device begins at 402 where geo-location data may be stored in a storage device within a communication network. The geo-location data may include a plurality of geo-location coordinates. Next, the geo-location data for each geo-location coordinate may be referenced to corresponding wireless coverage area ID data (404). The wireless coverage area ID data for each geo-location coordinate may include one or more wireless coverage area coordinate. Each wireless coverage area coordinate may represent a uniquely-identified sub-area within a coverage area of a first wireless network in the communication network. Each uniquely-identified sub-area may generally be formed by an operative RF signaling range for a wireless access point in the first wireless network. In other words, each specific sub-area defines the most granular or highest resolution RF coverage area representation for the overall coverage area for the first wireless network. The wireless coverage area ID data may be stored in the storage device. At 406, each wireless coverage area coordinate for each geo-location coordinate may be referenced to corresponding signal strength data. The signal strength data for each wireless coverage area coordinate may represent a signal strength value. Each signal strength value may represent a signal strength parameter associated with the corresponding wireless coverage area coordinate in relation to the corresponding geo-location coordinate. The signal strength data may be stored in the storage device.

In another embodiment of the process 400, the geo-location data, wireless coverage area ID data, and signal strength data may be stored in a server device. In this embodiment, the server device may include the storage device. In yet another embodiment of the process 400, the server device may also include a geo-location enablement server. In this embodiment, the geo-location enablement server may include the storage device.

In still another embodiment of the process 400, the communication network may include a PSTN, a wireless telephone network, a cellular telephone network, a satellite telephone network, an IP network, a VoIP network, a LAN, a WAN, a MAN, or any suitable type of communication network in any suitable combination. In yet still another embodiment of the process 400, the geo-location coordinates may include a GPS data format, a latitude measure, a longitude measure, an altitude measure, a country name, a state name, a city name, a street name, a street address, a building floor level, a building suite number, or any suitable geo-location parameter in any suitable combination.

In another embodiment of the process 400, the wireless coverage area ID data may include a plurality of wireless coverage area coordinates. In this embodiment, at least a portion of the plurality of wireless coverage area coordinates may be associated with a second wireless network in the communication network. In the embodiment being described, each wireless coverage area coordinate associated with the second wireless network may represent a uniquely-identified sub-area within a coverage area of the second wireless network.

In yet another embodiment of the process 400, the wireless coverage area coordinates may include a sub-cell ID, a cell sector ID, a media access control (MAC) address, a cell ID, a location area code, a mobile network code, a mobile country code, a wireless service provider, a wireless service operator, or any suitable wireless coverage area parameter in any suitable combination. In still another embodiment of the process 400, each uniquely-identified sub-area may include a sub-cell, a cell sector, a MAC area, a cell, a location area, or any suitable geographic portion of a coverage area for a wireless network in any suitable combination.

In still yet another embodiment of the process 400, the first wireless network may include a wireless telephone network, a cellular telephone network, a satellite telephone network, a wireless IP network, a wireless LAN, a wireless WAN, and a wireless MAN, or any suitable type of wireless network in any suitable combination. In another embodiment of the process 400, the wireless access point may include a base station, an RF transceiver, an RF transmitter, a satellite, an antenna, an RF radiator of a distributed antenna, or any suitable wireless access point in any suitable combination. In another embodiment of the process 400, the single strength values may include a decibel measure, a decibel measure referenced to one milliwatt, an active set updates (ASU) measure, a watt measure, an RF signal power measure, or any suitable signal strength measure in any suitable combination.

Figure 5:
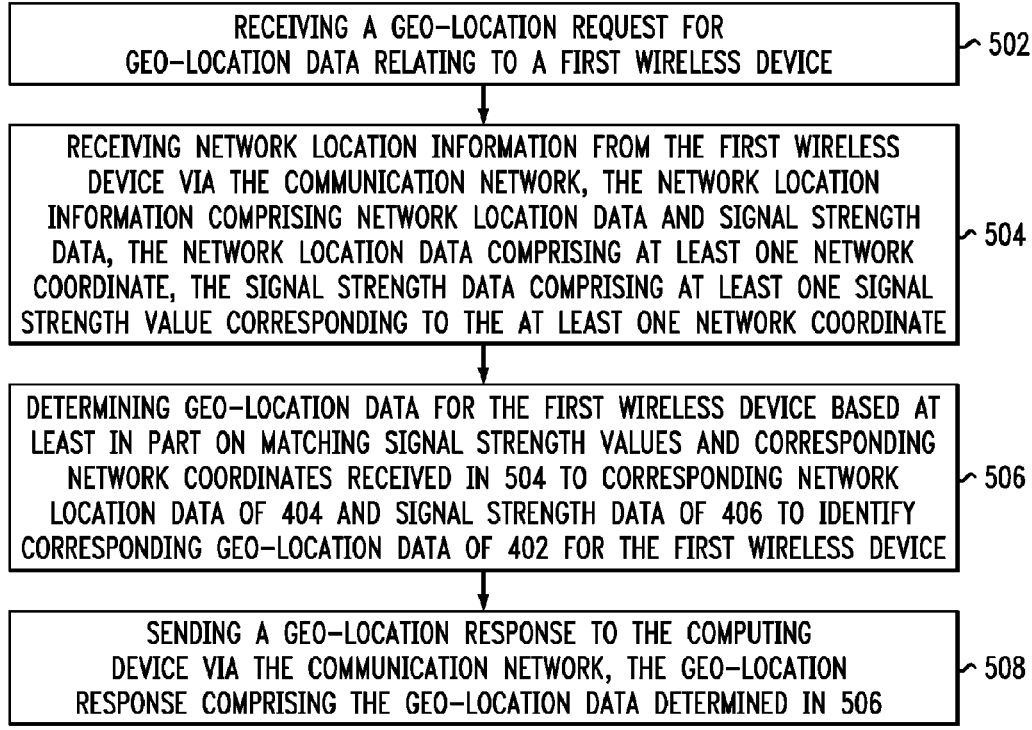
FIG. 5, in conjunction with FIG. 4, is a flow chart of another exemplary embodiment of a process for providing geo-location enablement for a wireless device.

With reference to FIGS. 4 and 5, in another exemplary embodiment of a process 500 for providing geo-location enablement for a wireless device may determine geo-location information for the wireless device in response to receiving a request for such information. The process 500 may include 402, 404, and 406 of FIG. 4. The process 500 may also include receiving a geo-location request for geo-location data relating to a first wireless device (502). The geo-location request may be received from a computing device via the communication network. At 504, wireless coverage area information may be received from the first wireless device via the communication network. The wireless coverage area information may include wireless coverage area ID data and signal strength data. The wireless coverage area ID data may include at least one wireless coverage area coordinate. Each wireless coverage area coordinate may represent an actual sub-area within the coverage area of the first wireless network for which the first wireless device is within operative RF signaling range of the corresponding wireless access point. In other words, each specific sub-area defines the most granular or highest resolution RF coverage area representation for the overall coverage area for the first wireless network. The signal strength data may include at least one signal strength value corresponding to the at least one wireless coverage area coordinate. Each signal strength value may represent an actual measurement of the signal strength parameter for an RF signal received by the first wireless device from the corresponding wireless access point associated with the corresponding wireless coverage area coordinate. Next, geo-location data for the first wireless device may be determined based at least in part on matching signal strength values and corresponding wireless coverage area coordinates received in 504 to corresponding wireless coverage area ID data of 404 and signal strength data of 406 to identify corresponding geo-location data of 402 for the first wireless device (506).

In another embodiment of the process 500, the geo-location request may be received from an over-the-top (OTT) client running on the computing device. In yet another embodiment of the process 500, the geo-location request may be received via an instant message (IM), a text message, a multi-media message, an e-mail message, or any suitable electronic messaging format in any suitable combination.

In still another embodiment of the process 500, the first wireless device may include a wireless telephone, a cellular telephone, a satellite telephone, a non-GPS-enabled wireless device, a portable computer device, a wireless IP telephone, or any suitable wireless device in any suitable combination. In still yet another embodiment of the process 500, the computing device may include a landline telephone, a wireless telephone, a cellular telephone, a satellite telephone, a portable computer device, a computer workstation, an IP telephone, or any suitable computing device in any suitable combination. In another embodiment of the process 500, the computing device and the first wireless device may form a multi-function user device.

In yet another embodiment of the process 500, the wireless coverage area information may be received from an OTT client running on the first wireless device. In another embodiment of the process 500, the wireless coverage area information may be received via an IM, a text message, a multi-media message, an e-mail message, or any suitable electronic messaging format in any suitable combination.

With continuing reference to FIG. 5, in yet another embodiment, the process 500 may also include sending a geo-location response to the computing device via the communication network (508). In this embodiment, the geo-location response may include the geo-location data determined in 506. In a further embodiment, the process 500 may also include periodically repeating 504 through 508 for the first wireless device. In another embodiment of the process 500, the periodic repeating of 504 through 508 may continue until a request cancellation is received from the computing device via the communication network. In a further embodiment, the process 500 may also include performing 402 through 406 for a second wireless network. In this embodiment, the process 500 may also include performing 502 for the second wireless network and a second wireless device in operative communication with the communication network via the second wireless network. In the embodiment being described, the process 500 may also include periodically repeating 504 through 508 for the second wireless device. In this embodiment, the periodic repeating for either or both of the first and second wireless devices may be based on a predetermined time interval, a change in location of the corresponding wireless device by a predetermined distance, a change in location of the corresponding wireless device by sub-area for the corresponding wireless network, a change in location of the corresponding wireless device resulting in different wireless access points being within operative RF signaling range, a power up cycle of the corresponding wireless device, a registration cycle with the corresponding wireless network for the corresponding wireless device, a message originated by the corresponding wireless device, a message received by the corresponding wireless device, or any suitable periodic timing parameter in any suitable combination.

In another embodiment of the process 500, the geo-location response in 508 may be sent to an OTT client running on the computing device. In yet another embodiment of the process 500, the geo-location response may be sent via an IM, a text message, a multi-media message, an e-mail message, or any suitable electronic messaging format in any suitable combination.

In still another embodiment, the process 500 may also include sending a wireless coverage area request to the first wireless device via the communication network in response to receiving the geo-location request in 502. The wireless coverage area request may include a request for the wireless coverage area coordinates and signal strength values of 504.

In still yet another embodiment of the process 500, the wireless coverage area request may be sent to an OTT client running on the first wireless device. In another embodiment of the process 500, the wireless coverage area request may be sent via an IM, a text message, a multi-media message, an e-mail message, or any suitable electronic messaging format in any suitable combination.

With reference to FIGS. 4 and 6, in another exemplary embodiment of a process 600 for providing geo-location enablement for a wireless device may store geo-location information for a wireless device in response to receiving such information. The process 600 may include 402, 404, and 406 of FIG. 4. The process 600 may also include receiving geo-location information from a wireless device within the first wireless network via the communication network (602). The geo-location information may include geo-location data, wireless coverage area ID data, and signal strength data. The geo-location data may include a geo-location coordinate. The geo-location coordinate may represent an actual location of the wireless device within the coverage area of the first wireless network. The wireless coverage area ID data may include at least one wireless coverage area coordinate. Each wireless coverage area coordinate may represent an actual sub-area within the coverage area of the first wireless network for which the wireless device is within operative RF signaling range of the corresponding wireless access point. In other words, each specific sub-area defines the most granular or highest resolution RF coverage area representation for the overall coverage area for the first wireless network. The signal strength data may include at least one signal strength value corresponding to the at least one wireless coverage area coordinate. Each signal strength value may represent an actual measurement of the signal strength parameter for an RF signal received by the first wireless device from the wireless access point associated with the corresponding wireless coverage area coordinate.

At 604, geo-location coordinates from 602 may be stored in the storage device as geo-location data unless the geo-location data in the storage device already includes the geo-location coordinate. Next, wireless coverage area coordinates from 602 may be stored in the storage device as wireless coverage area ID data (606). Each stored wireless coverage area coordinate may be referenced to the corresponding stored geo-location coordinate of 604. At 608, signal strength values from 602 may be stored in the storage device as signal strength data. Each stored signal strength value may be referenced to the corresponding stored wireless coverage area coordinate of 606.

In another embodiment of the process 600, the geo-location information may be received from an OTT client running on the wireless device. In yet another embodiment of the process 600, the geo-location information may be received via an IM, a text message, a multi-media message, an e-mail message, or any suitable electronic messaging format in any suitable combination. In still another embodiment of the process 600, the wireless device may include a wireless telephone, a cellular telephone, a satellite telephone, a GPS-enabled wireless device, a portable computer device, a wireless IP telephone, or any suitable wireless device in any suitable combination.

In still yet another embodiment, the process 600 may also include periodically repeating 602 through 608 for the wireless device. In another embodiment, the process 600 may include periodically repeating 602 through 608 for a first plurality of wireless devices. In a further embodiment, the process 600 may also include performing 402 through 406 for a second wireless network. In this embodiment, the process 600 may also include periodically repeating 602 through 608 for the second wireless network and a second plurality of wireless devices in operative communication with the communication network via the second wireless network.

In another embodiment of the process 600, the periodic repeating of 602 through 608 for at least one of the wireless device, first plurality of wireless devices, and second plurality of wireless devices may be based on a predetermined time interval, a change in location of the corresponding wireless device by a predetermined distance, a change in location of the corresponding wireless device by sub-area for the corresponding wireless network, a change in location of the corresponding wireless device resulting in different wireless access points being within operative RF signaling range, a power up cycle of the corresponding wireless device, a registration cycle with the corresponding wireless network for the corresponding wireless device, a message originated by the corresponding wireless device, a message received by the corresponding wireless device, or any suitable periodic timing parameter in any suitable combination.

In yet another embodiment of the process 600, the periodic repeating of 602 through 608 for at least one of the wireless device, first plurality of wireless devices, and second plurality of wireless devices may be performed to seed the geo-location data, wireless coverage area ID data, and signal strength data in the storage device. In still another embodiment of the process 600, the periodic repeating of 602 through 608 for at least one of the wireless device, first plurality of wireless devices, and second plurality of wireless devices may be performed in a crowdsourcing manner. In other words, a plurality of users may voluntarily provision wireless devices to provide the geo-location information.

In still yet another embodiment, the process 600 may include sending a geo-location request to the wireless device via the communication network. The geo-location request may include a request for the geo-location coordinate and corresponding wireless coverage area coordinates and signal strength values of 602. In this embodiment, the geo-location request may be sent to an OTT client running on the wireless device. In the embodiment being described, the geo-location request may be sent via an IM, a text message, a multi-media message, an e-mail message, or any suitable electronic messaging format in any suitable combination.

In this embodiment, the process 600 may also include periodically repeating the sending of the geo-location request and 602 through 608 for the wireless device. In the embodiment being described, the process 600 may also include periodically repeating the sending of the geo-location request and 602 through 608 for a first plurality of wireless devices. In another embodiment of the process 600, the periodic repeating of the sending of the geo-location request for either or both the wireless device and the first plurality of wireless devices may be based on a predetermined time interval or any suitable periodic timing parameter in any suitable combination.

Figure 7:
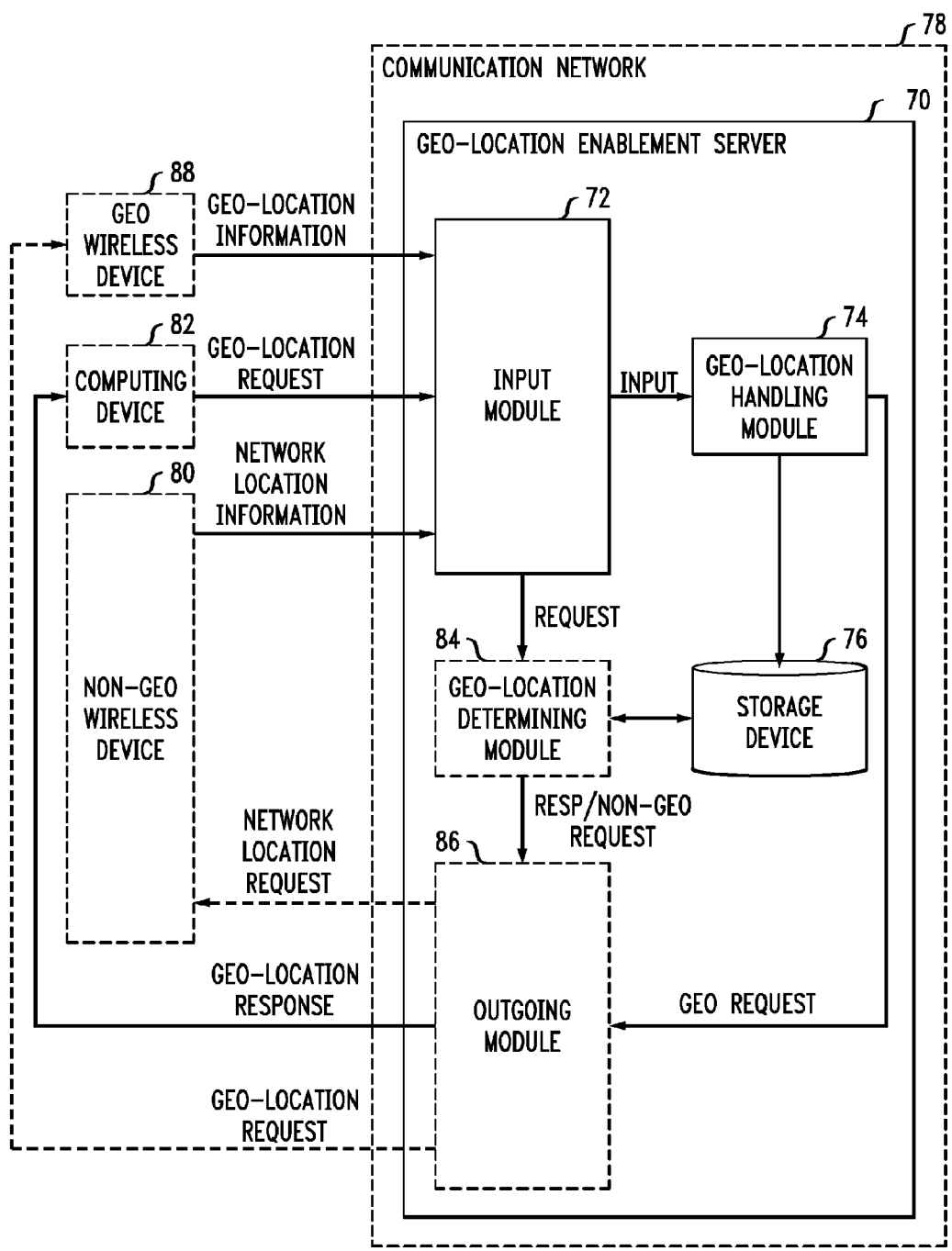
FIG. 7 is a block diagram of yet another exemplary embodiment of a geo-location enablement server in a communication network.

With reference to FIG. 7, an exemplary embodiment of a geo-location enablement server 70 for providing geo-location enablement for a wireless device may include an input module 72, a geo-location handling module 74, and a storage device 76. The input module 72 may receive geo-location information via a communication network 78. The geo-location information may include geo-location data, wireless coverage area ID data, and signal strength data. The geo-location handling module 74 may be in operative communication with the input module 72 for processing the geo-location data, wireless coverage area ID data, and signal strength data. The storage device 76 may be in operative communication with the geo-location handling module 74 for storing the geo-location data, wireless coverage area ID data, and signal strength data.

The geo-location data may include a plurality of geo-location coordinates. The geo-location data for each geo-location coordinate may be referenced to corresponding wireless coverage area ID data. The wireless coverage area ID data for each geo-location coordinate may include one or more wireless coverage area coordinate. Each wireless coverage area coordinate may represent a uniquely-identified sub-area within a coverage area of a first wireless network in the communication network 78. Each uniquely-identified sub-area generally formed by an operative RF signaling range for a wireless access point in the first wireless network. In other words, each specific sub-area defines the most granular or highest resolution RF coverage area representation for the overall coverage area for the first wireless network. Each wireless coverage area coordinate for each geo-location coordinate may be referenced to corresponding signal strength data. The signal strength data for each wireless coverage area coordinate may represent a signal strength value. Each signal strength value may represent a signal strength parameter associated with the corresponding wireless coverage area coordinate in relation to the corresponding geo-location coordinate.

Figure 8:
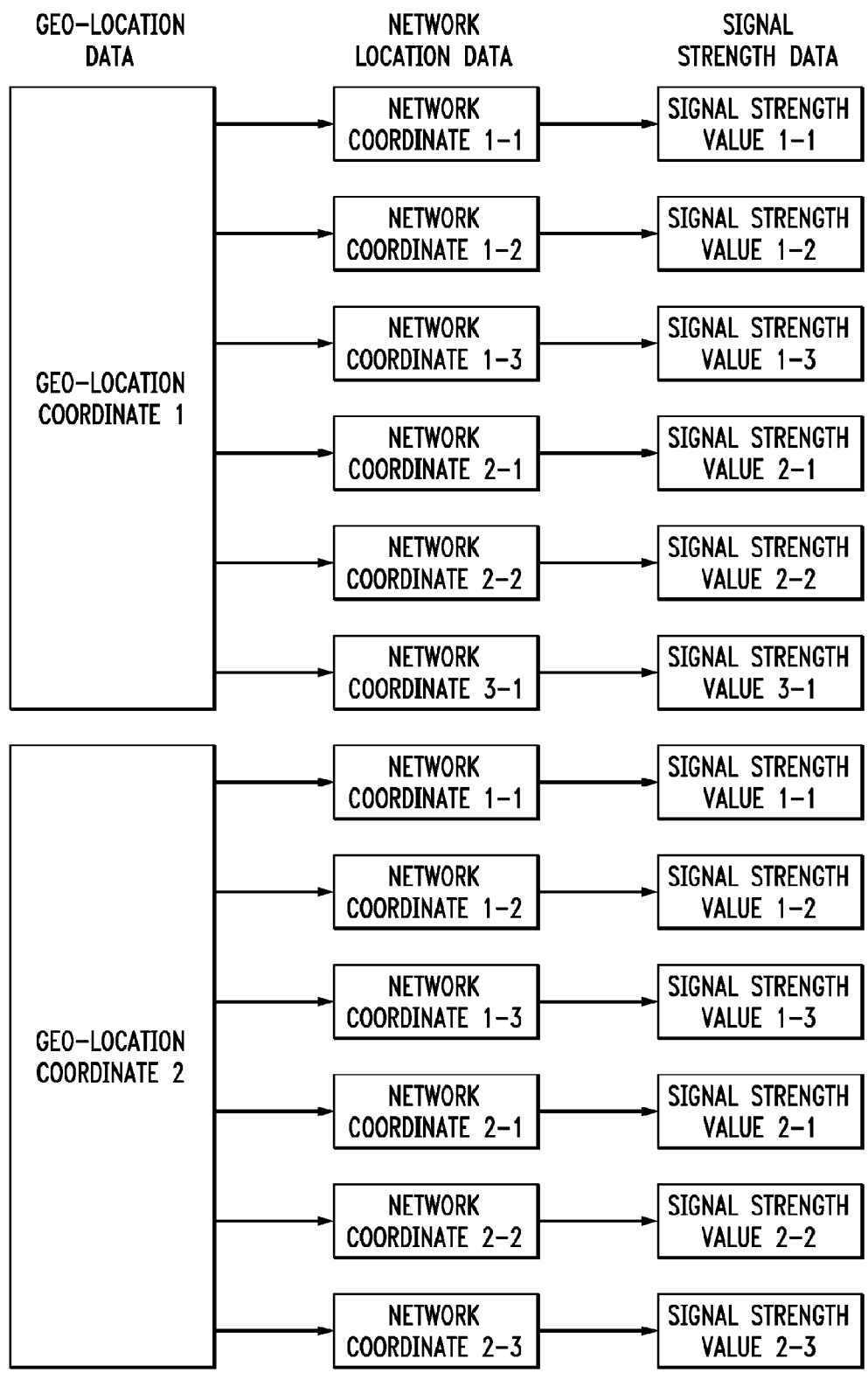
FIG. 8 is an exemplary arrangement of geo-location data, wireless coverage area ID data, and signal strength data associated with providing geo-location enablement for a wireless device.

With reference to FIG. 8, an exemplary arrangement of geo-location data, wireless coverage area ID data and signal strength location data is shown. In this arrangement the geo-location data includes two geo-location coordinates (1 and 2). Each geo-location coordinate may represent a unique geographic location. Geo-location coordinate 1 is referenced to wireless coverage area ID data from three wireless networks (1-*n*, 2-*n*, and 3-*n*). Geo-location coordinate 2 is referenced to wireless coverage area ID data from two of the same wireless networks (1-*n* and 2-*n*). More specifically, geographic coordinate 1 is referenced to three wireless coverage area coordinates in a first wireless network (1-1, 1-2, and 1-3), two wireless coverage area coordinates in a second wireless network (2-1 and 2-2) and one wireless coverage area coordinate in a third wireless network (3-1). Similarly, geographic coordinate 2 is referenced to the three wireless coverage area coordinates in the first wireless network (1-1, 1-2, and 1-3) and three wireless coverage area coordinates in the second wireless network (2-1, 2-2, and 2-3). For example, wireless coverage area coordinates can be viewed as sub-areas or cells within wireless networks that are generally defined by an operative RF signaling range of a wireless access point within the corresponding sub-area. For example, each wireless access point may be an antenna or an RF radiator of a distributed antenna associated with a cell tower or base station within the corresponding sub-area.

The signal strength data includes a plurality of signal strength values. Each signal strength value is referenced to a corresponding wireless coverage area coordinate to form wireless coverage area ID and signal strength data pairs. In other words, for each geo-location coordinate, the corresponding wireless coverage area ID and signal strength data pair represents a signal strength value for an RF signal from the wireless access point at the corresponding wireless coverage area coordinate. For example, at geo-location coordinate 1, the RF signal from the wireless access point in the first network for wireless coverage area coordinate 1-1 is represented by signal strength value 1-1. Similarly, the RF signal from the wireless access point in the second network at geo-location coordinate 1 is represented by signal strength value 2-1 for wireless coverage area coordinate 2-1. Likewise, at geo-location coordinate 1, the RF signal from the wireless access point in the second network for wireless coverage area coordinate 3-1 is represented by signal strength value 3-1.

Figure 9:
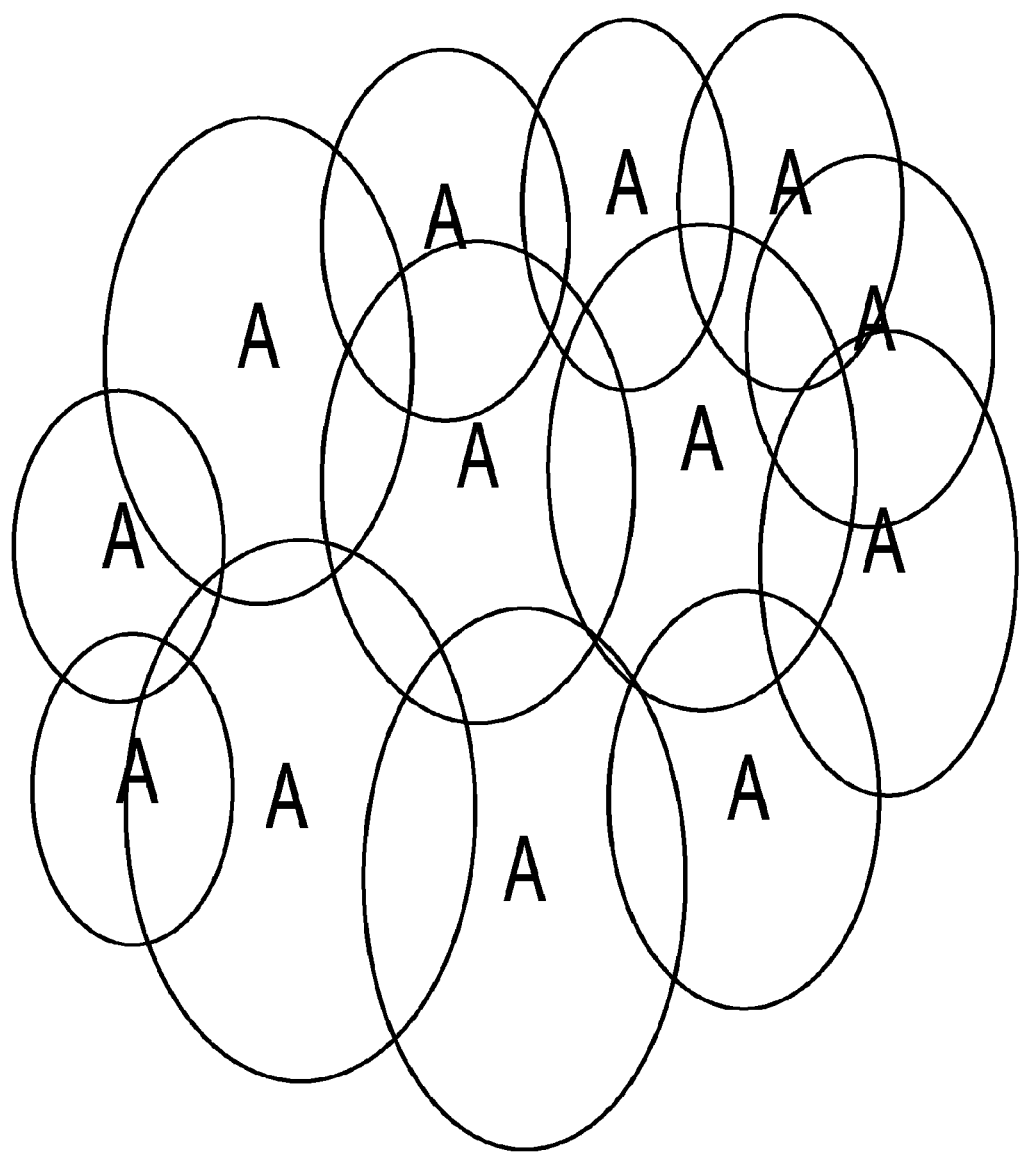
FIG. 9 is an exemplary arrangement of sub-areas that form a coverage area for an exemplary wireless network.

With reference to FIG. 9, an exemplary arrangement of uniquely-identified sub-areas or cells forms a coverage area for a wireless network. Each cell is generally formed by an operative RF signaling range for a wireless access point in the wireless network. The wireless access points for each cell in the wireless network are represented by A in FIG. 9. For example, each wireless access point may be an antenna or an RF radiator of a distributed antenna associated with a cell tower or base station within the corresponding sub-area.

With reference again to FIG. 7, in another embodiment, the communication network 78 may also include a PSTN, a wireless telephone network, a cellular telephone network, a satellite telephone network, an IP network, a VoIP network, a LAN, a WAN, a MAN, or any suitable type of communication network in any suitable combination. In yet another embodiment of the geo-location enablement server 70, the geo-location coordinates may include a GPS data format, a latitude measure, a longitude measure, an altitude measure, a country name, a state name, a city name, a street name, a street address, a building floor level, a building suite number, or any suitable geo-location parameter in any suitable combination.

In still another embodiment of the geo-location enablement server 70, the wireless coverage area ID data may include a plurality of wireless coverage area coordinates, at least a portion of the plurality of wireless coverage area coordinates associated with a second wireless network in the communication network 78. Each wireless coverage area coordinate associated with the second wireless network may represent a uniquely-identified sub-area within a coverage area of the second wireless network.

In still yet another embodiment of the geo-location enablement server 70, the wireless coverage area coordinates may include a sub-cell ID, a cell sector ID, a MAC address, a cell ID, a location area code, a mobile network code, a mobile country code, a wireless service provider, a wireless service operator, or any suitable wireless coverage area parameter in any suitable combination. In another embodiment of the geo-location enablement server 70, each uniquely-identified sub-area may include a sub-cell, a cell sector, a MAC area, a cell, a location area, or any suitable geographic portion of a coverage area for a wireless network in any suitable combination.

In yet another embodiment of the geo-location enablement server 70, the first wireless network may include a wireless telephone network, a cellular telephone network, a satellite telephone network, a wireless IP network, a wireless LAN, a wireless WAN, a wireless MAN, or any suitable type of wireless network in any suitable combination. In still another embodiment of the geo-location enablement server 70, the wireless access point may include a base station, an RF transceiver, an RF transmitter, a satellite, an antenna, an RF radiator of a distributed antenna, or any suitable wireless access point in any suitable combination. In still yet another embodiment of the geo-location enablement server 70, the single strength values may include a decibel measure, a decibel measure referenced to one milliwatt, an ASU measure, a watt measure, an RF signal power measure, or any suitable signal strength measure in any suitable combination.

In another embodiment of the geo-location enablement server 70, the input module 72 may receive a geo-location request for geo-location data relating to a first wireless device 80. The geo-location request may be received from a computing device 82 via the communication network 78. The input module 72 may also receive wireless coverage area information from the first wireless device 80 via the communication network 78. The wireless coverage area information may include wireless coverage area ID data and signal strength data. The wireless coverage area ID data may include at least one wireless coverage area coordinate. Each wireless coverage area coordinate may represent an actual sub-area within the coverage area of the first wireless network for which the first wireless device 80 is within operative RF signaling range of the corresponding wireless access point. In other words, each specific sub-area defines the most granular or highest resolution RF coverage area representation for the overall coverage area for the first wireless network. The signal strength data may include at least one signal strength value corresponding to the at least one wireless coverage area coordinate. Each signal strength value may represent an actual measurement of the signal strength parameter for an RF signal received by the first wireless device 80 from the wireless access point associated with the corresponding wireless coverage area coordinate. In the embodiment being described, the geo-location enablement server 70 may also include a geo-location determining module 84 in operative communication with the input module 72 and storage device 76. The geo-location determining module 84 may process the geo-location request and wireless coverage area information to determine geo-location data for the first wireless device 80 based at least in part on matching signal strength values and corresponding wireless coverage area coordinates received in the wireless coverage area information from the first wireless device 80 to corresponding wireless coverage area ID data and signal strength data stored in the storage device 76 to identify corresponding geo-location data stored in the storage device 76 that relates to the first wireless device 80.

In yet another embodiment of the geo-location enablement server 70, the geo-location request may be received from an OTT client running on the computing device 82. In still another embodiment of the geo-location enablement server 70, the geo-location request may be received via an IM, a text message, a multi-media message, an e-mail message, or any suitable electronic messaging format in any suitable combination.

In still yet another embodiment, the first wireless device 80 may include a wireless telephone, a cellular telephone, a satellite telephone, a non-GPS-enabled wireless device, a portable computer device, a wireless IP telephone, or any suitable wireless device in any suitable combination. In another embodiment, the computing device 82 may include a landline telephone, a wireless telephone, a cellular telephone, a satellite telephone, a portable computer device, a computer workstation, an IP telephone, or any suitable computing device in any suitable combination. In yet another embodiment, the computing device 82 and the first wireless device 80 may form a multi-function user device.

In still another embodiment of the geo-location enablement server 70, the wireless coverage area information may be received from an OTT client running on the first wireless device 80. In still yet another embodiment of the geo-location enablement server 70, the wireless coverage area information may be received via an IM, a text message, a multi-media message, an e-mail message, or any suitable electronic messaging format in any suitable combination.

In still yet another embodiment, the geo-location enablement server 70 may also include an output module 86 in operative communication with the geo-location determining module 84. In this embodiment, the output module 86 may send a geo-location response to the computing device 82 via the communication network 78. In the embodiment being described, the geo-location response may include the geo-location data determined by the geo-location determining module 84. In a further embodiment, after the input module 72 receives the geo-location request for geo-location data relating to the first wireless device 80, the input module 72 may periodically receive wireless coverage area information from the first wireless device 80. In this embodiment, the geo-location determining module 84 and output module 86 may operate such that geo-location responses are periodically sent in a manner that corresponds to the periodic receipt of the wireless coverage area information. In another further embodiment, the periodic actions may continue until the input module 72 receives a request cancellation from the computing device 82 via the communication network 78. In yet another further embodiment, geo-location data, wireless coverage area ID data, and signal strength data for a second wireless network may be stored in the storage device 76. In this embodiment, after the input module 72 receives a second geo-location request from the computing device 82 for geo-location data relating to a second wireless device 80 in operative communication with the communication network via the second wireless network, the input module 72 periodically receives wireless coverage area information from the second wireless device 80. In the embodiment being described, the geo-location determining module 84 and output module 86 may operate such that geo-location responses associated with the second wireless device 80 may be periodically sent to the computing device 82 in a manner that corresponds to the periodic receipt of the wireless coverage area information from the second wireless device 80. In this embodiment, the periodic receipt of wireless coverage area information from at least one wireless device may be based on a predetermined time interval, a change in location of the corresponding wireless device by a predetermined distance, a change in location of the corresponding wireless device by sub-area for the corresponding wireless network, a change in location of the corresponding wireless device resulting in different wireless access points being within operative RF signaling range, a power up cycle of the corresponding wireless device, a registration cycle with the corresponding wireless network for the corresponding wireless device, a message originated by the corresponding wireless device, a message received by the corresponding wireless device, or any suitable periodic timing parameter in any suitable combination.

In another embodiment of the geo-location enablement server 70, the geo-location response may be sent to an OTT client running on the computing device 82. In yet another embodiment of the geo-location enablement server 70, the geo-location response may be sent via at least one of an IM, a text message, a multi-media message, an e-mail message, or any suitable electronic messaging format in any suitable combination.

In still another embodiment of the geo-location enablement server 70, the output module 84 may send a wireless coverage area request to the first wireless device 80 via the communication network 78 in response to the input module 72 receiving the geo-location request. In this embodiment, the wireless coverage area request may include a request for wireless coverage area coordinates and corresponding signal strength values from the first wireless device 80. In still yet another embodiment of the geo-location enablement server 70, the wireless coverage area request may be sent to an OTT client running on the first wireless device 80. In another embodiment of the geo-location enablement server 70, the wireless coverage area request may be sent via an IM, a text message, a multi-media message, an e-mail message, or any suitable electronic messaging format in any suitable combination.

In yet another embodiment of the geo-location enablement server 70, the input module 72 may receive geo-location information from a wireless device 88 within the first wireless network via the communication network 78. The geo-location information may include geo-location data, wireless coverage area ID data, and signal strength data. The geo-location data may include a geo-location coordinate representing an actual location of the wireless device 88 within the coverage area of the first wireless network. The wireless coverage area ID data may include at least one wireless coverage area coordinate. Each wireless coverage area coordinate may represent an actual sub-area within the coverage area of the first wireless network for which the wireless device 88 is within operative RF signaling range of the corresponding wireless access point. In other words, each specific sub-area defines the most granular or highest resolution RF coverage area representation for the overall coverage area for the first wireless network. The signal strength data may include at least one signal strength value corresponding to the at least one wireless coverage area coordinate. Each signal strength value may represent an actual measurement of the signal strength parameter for an RF signal received by the wireless device 88 from the wireless access point associated with the corresponding wireless coverage area coordinate. The geo-location handling module 74 may process the geo-location data received from the wireless device 88 and store the corresponding geo-location coordinates in the storage device 76 as geo-location data unless the geo-location data in the storage device 76 already includes the geo-location coordinate. The geo-location handling module 74 may also process the wireless coverage area ID data received from the wireless device 88 and store the corresponding wireless coverage area coordinates in the storage device 76 such that each stored wireless coverage area coordinate is referenced to the corresponding stored geo-location coordinate. The geo-location handling module 74 may also process the signal strength data received from the wireless device 88 and store the corresponding signal strength values in the storage device 76 such that each stored signal strength value is referenced to the corresponding stored wireless coverage area coordinate.

In still another embodiment of the geo-location enablement server 70, the geo-location information may be received from an OTT client running on the wireless device 88. In still yet another embodiment of the geo-location enablement server 70, the geo-location information may be received via at least one of an IM, a text message, a multi-media message, an e-mail message, or any suitable electronic message format in any suitable combination. In another embodiment, the wireless device 88 may include a wireless telephone, a cellular telephone, a satellite telephone, a GPS-enabled wireless device, a portable computer device, a wireless IP telephone, or any suitable wireless device in any suitable combination.

In yet another embodiment of the geo-location enablement server 70, the input module 72 may periodically receive geo-location information from the wireless device 88. In this embodiment, the geo-location handling module 74 and storage device may operate such that geo-location coordinates, wireless coverage area coordinates, and signal strength values are periodically stored with corresponding referencing in a manner that corresponds to the periodic receipt of the geo-location information. In a further embodiment, the input module 72 periodically receives geo-location information from a first plurality of wireless devices 88. In this embodiment, the geo-location handling module 74 and storage device 76 operate such that corresponding geo-location coordinates, wireless coverage area coordinates, and signal strength values are periodically stored with corresponding referencing in a manner that corresponds to the periodic receipt of the geo-location information from the first plurality of wireless devices 88. In another further embodiment, geo-location data, wireless coverage area ID data, and signal strength data for a second wireless network are stored in the storage device 76 and the input module 72 periodically receives geo-location information from a second plurality of wireless devices 88 in operative communication with the communication network via the second wireless network. In this embodiment, the geo-location handling module 74 and storage device 76 operate such that corresponding geo-location coordinates, wireless coverage area coordinates, and signal strength values are periodically stored with corresponding referencing in a manner that corresponds to the periodic receipt of the geo-location information from the second plurality of wireless devices 88. In this embodiment, the periodic receipt of geo-location information from at least one wireless device 88 may be based on a predetermined time interval, a change in location of the corresponding wireless device by a predetermined distance, a change in location of the corresponding wireless device by sub-area for the corresponding wireless network, a change in location of the corresponding wireless device resulting in different wireless access points being within operative RF signaling range, a power up cycle of the corresponding wireless device, a registration cycle with the corresponding wireless network for the corresponding wireless device, a message originated by the corresponding wireless device, a message received by the corresponding wireless device, or any suitable periodic timing parameter in any suitable combination.

In still another embodiment of the geo-location enablement server 70, the periodic actions associated with the first plurality of wireless devices 88 may be repeated to seed the geo-location data, wireless coverage area ID data, and signal strength data in the storage device 76. In still yet another embodiment of the geo-location enablement server 70, the periodic actions associated with the first plurality of wireless devices 88 may be repeated in a crowdsourcing manner. In other words, a plurality of users may voluntarily provision wireless devices to provide the geo-location information.

In still yet another embodiment of the geo-location enablement server 70, the output module 86 may be operative communication with the geo-location handling module 74. In this embodiment, the output module 86 may send a geo-location request to the wireless device 88 via the communication network 78. In the embodiment being described, the geo-location request may include a request for the geo-location coordinate and corresponding wireless coverage area coordinates and signal strength values from the wireless device 88. In this embodiment, the geo-location request may be sent to an OTT client running on the wireless device 88. In the embodiment being described, the geo-location request may be sent via an IM, a text message, a multi-media message, an e-mail message, or any suitable electronic message format in any suitable combination.

In another embodiment of the geo-location enablement server 70, the output module 86 may periodically send the geo-location request to the wireless device 88. In yet another embodiment of the geo-location enablement server 70, the output module 86 may periodically send the geo-location request to a plurality of wireless devices 88. In still another embodiment of the geo-location enablement server 70, the periodic sending of the geo-location request to at least one wireless device 88 is based at least in part on a predetermined time interval or any suitable periodic timing parameter in any suitable combination.

Figure 10:
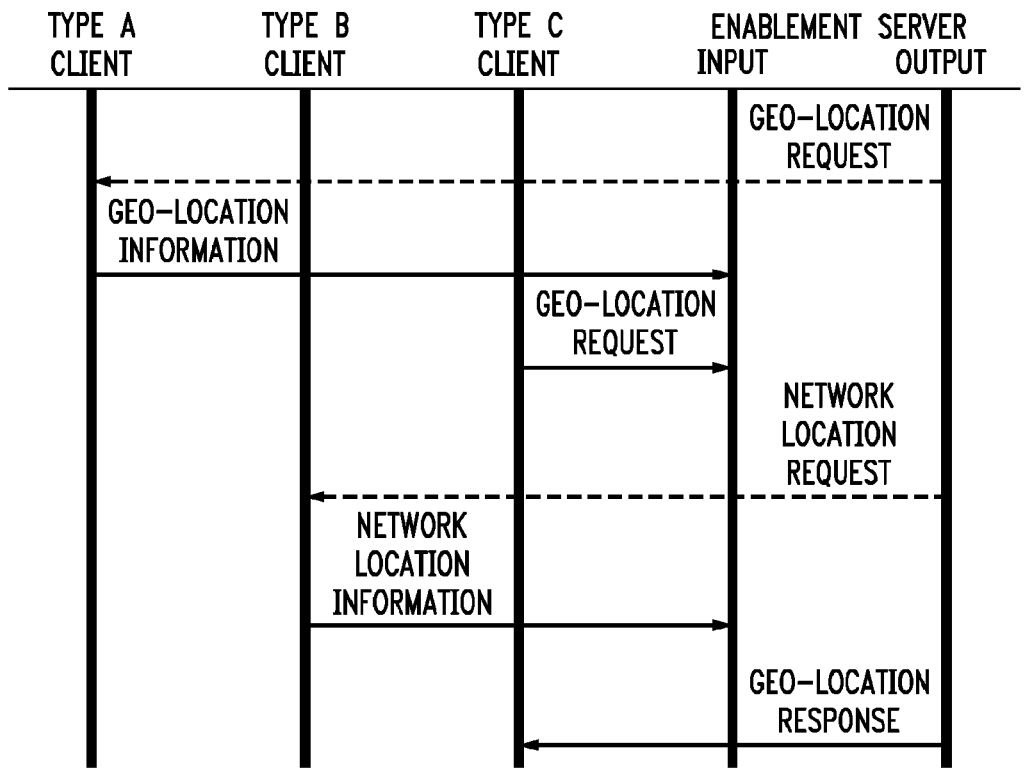
FIG. 10 is an exemplary message flow diagram for an exemplary embodiment of a geo-location enablement server in a communication network.

With reference to FIG. 10, an exemplary messaging flow diagram shows how an exemplary embodiment of a geo-location enablement server may communicate with an application program having Type A, Type B, and Type C clients on remote devices. The Type A client runs on a geo wireless device (see FIG. 7, 88). The Type B client runs on a non-geo wireless device (see FIG. 7, 80). The Type C client runs on a computing device (see FIG. 7, 82). The geo-location enablement server includes input and output modules in operative communication with the Type A, Type B, and Type C clients via a communication network.

The Type A client provides a GEO-LOCATION INFORMATION message to an input module of the geo-location enablement server to populate the server with geo-location data, wireless coverage area ID data, and signal strength data. A plurality of Type A clients associated with a plurality of wireless networks may be used to populate the geo-location enablement server. The GEO-LOCATION INFORMATION message may be provided automatically, in response to user interaction at the corresponding geo wireless device, or in response to a GEO-LOCATION REQUEST message from the geo-location enablement server.

The Type C client provides a GEO-LOCATION REQUEST message to the input module of the geo-location enablement server to request a geographic location for a non-geo wireless device on which a Type B client is running. A plurality of Type C clients may have access to the geo-location enablement server for such requests. Each Type C client may request geographic locations for multiple Type B clients. Each GEO-LOCATION REQUEST message may include parameters identifying whether the message is a one-time request or a tracking request. A tracking request may identify a period interval for updates and expiration criteria. Alternatively, periodic updates to a tracking request may continue until the geo-location enablement server receives a REQUEST CANCELLATION message from the corresponding Type C client. The GEO-LOCATION REQUEST message may be provided automatically or in response to user interaction at the corresponding computing device.

The Type C client provides a WIRELESS COVERAGE AREA INFORMATION message to an input module of the geo-location enablement server in relation to the GEO-LOCATION REQUEST message requesting its geographic location. The WIRELESS COVERAGE AREA INFORMATION message may include wireless coverage area ID data and corresponding signal strength data. The WIRELESS COVERAGE AREA INFORMATION message may be provided automatically, in response to user interaction at the corresponding non-geo wireless device, or in response to a WIRELESS COVERAGE AREA REQUEST message from the geo-location enablement server.

The geo-location enablement server uses the wireless coverage area ID data and corresponding signal strength data in the WIRELESS COVERAGE AREA INFORMATION message from the non-geo wireless device to look up geo-location data at the geo-location enablement server that corresponds to the wireless coverage area ID and signal strength data in the corresponding WIRELESS COVERAGE AREA INFORMATION message. The determined geo-location data is sent to the Type C client in a GEO-LOCATION RESPONSE message. This provides the requested geographic location for the corresponding non-geo wireless device.

Figure 11:
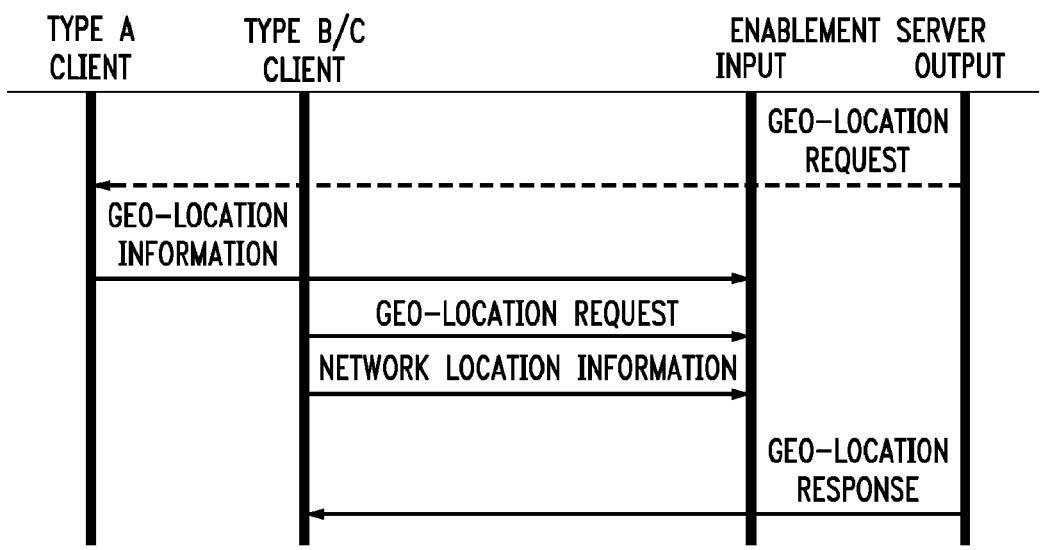
FIG. 11 is another exemplary message flow diagram for the geo-location enablement server of FIG. 10.

With reference to FIG. 11, another exemplary messaging flow diagram shows how another exemplary embodiment of a geo-location enablement server may communicate with an application program having Type A and Type B/C clients on remote devices. The Type A client operates the same as the Type A client in the above description of FIG. 10. The Type B/C client runs on a multi-function user device that may include a non-geo wireless device (see FIG. 7, 80) and a computing device (see FIG. 7, 82). The geo-location enablement server includes input and output modules in operative communication with the Type A and Type B/C clients via a communication network.

The Type B/C client provides a GEO-LOCATION REQUEST message to the input module of the geo-location enablement server to request its geographic location. A plurality of Type B/C clients may have access to the geo-location enablement server for such requests. Each GEO-LOCATION REQUEST message may include parameters identifying whether the message is a one-time request or a tracking request. A tracking request may identify a period interval for updates and expiration criteria. Alternatively, periodic updates to a tracking request may continue until the geo-location enablement server receives a REQUEST CANCELLATION message from the corresponding Type B/C client. The GEO-LOCATION REQUEST message may be provided automatically or in response to user interaction at the corresponding multi-function user device.

The Type B/C client provides a WIRELESS COVERAGE AREA INFORMATION message to an input module of the geo-location enablement server in relation to the GEO-LOCATION REQUEST message requesting its geographic location. The WIRELESS COVERAGE AREA INFORMATION message may include wireless coverage area ID data and corresponding signal strength data. The WIRELESS COVERAGE AREA INFORMATION message may be provided automatically, in response to user interaction at the corresponding multi-function user device, or in response to a WIRELESS COVERAGE AREA REQUEST message from the geo-location enablement server.

The geo-location enablement server uses the wireless coverage area ID data and corresponding signal strength data in the WIRELESS COVERAGE AREA INFORMATION message from the non-geo wireless device to look up geo-location data at the geo-location enablement server that corresponds to the wireless coverage area ID and signal strength data in the corresponding WIRELESS COVERAGE AREA INFORMATION message. The determined geo-location data is sent to the Type B/C client in a GEO-LOCATION RESPONSE message. This provides the requested geographic location for the corresponding multi-function user device.

With reference to FIG. 12, an exemplary embodiment of a process 1200 for providing geo-location enablement for a wireless device begins at 1202 where geo-location data may be stored in a geo-location enablement server within a communication network. The geo-location data may include a plurality of geo-location coordinates. Each geo-location coordinate may include a latitude measure and a longitude measure. Next, the geo-location data for each geo-location coordinate may be referenced to corresponding wireless coverage area ID data (1204). The wireless coverage area ID data for each geo-location coordinate may include one or more wireless coverage area coordinate. Each wireless coverage area coordinate may include a cell ID, a location area code, a mobile network code, and a mobile country code. Each wireless coverage area coordinate may represent a uniquely-identified cell area within a coverage area of a particular wireless network in the communication network. Each uniquely-identified cell area may generally be formed by an operative RF signaling range for a base station in the particular wireless network. The wireless coverage area ID data for a plurality of wireless networks may be stored in the geo-location enablement server. The wireless coverage area ID data for each wireless network may include a plurality of wireless coverage area coordinates.

At 1206, each wireless coverage area coordinate for each geo-location coordinate may be referenced to corresponding signal strength data. The signal strength data for each wireless coverage area coordinate may represent a signal strength value. Each signal strength value may include a decibel measure referenced to one milliwatt or an ASU measure in any combination. Each signal strength value may represent a signal strength parameter associated with the corresponding wireless coverage area coordinate in relation to the corresponding geo-location coordinate. The signal strength data for a plurality of wireless networks may be stored in the geo-location enablement server. The signal strength data for each wireless network may include a plurality of signal strength values. In another embodiment of the process 1200, each geo-location coordinate may also include an altitude measure.

With reference to FIGS. 12 and 13, in another exemplary embodiment of a process 1300 for providing geo-location enablement for a wireless device may determine geo-location information for the wireless device in response to receiving a request for such information. The process 1300 may include 1202, 1204, and 1206 of FIG. 12. The process 1300 may also include receiving a geo-location request for geo-location data relating to a first wireless device associated with a first wireless network (1302). The geo-location request may be received from a computing device via the communication network. At 1304, wireless coverage area information may be received from the first wireless device via the communication network. The wireless coverage area information may include wireless coverage area ID data and signal strength data. The wireless coverage area ID data may include at least one wireless coverage area coordinate. Each wireless coverage area coordinate may represent an actual cell area within the coverage area of the first wireless network for which the first wireless device is within operative RF signaling range of the corresponding base station in the first wireless network. The signal strength data may include at least one signal strength value corresponding to the at least one wireless coverage area coordinate. Each signal strength value may represent an actual measurement of the signal strength parameter for an RF signal received by the first wireless device from the corresponding base station associated with the corresponding wireless coverage area coordinate. Next, geo-location data for the first wireless device may be determined based at least in part on matching signal strength values and corresponding wireless coverage area coordinates received in 1304 to corresponding wireless coverage area ID data of 1204 and signal strength data of 1206 to identify corresponding geo-location data of 1202 for the first wireless device (1306).

In another embodiment of the process 1300, the geo-location request may be received from an OTT client running on the computing device. In yet another embodiment of the process 1300, the geo-location request may be received via an IM, a text message, a multi-media message, or an e-mail message. In still another embodiment of the process 1300, the computing device and the first wireless device may form a multi-function user device.

In still yet another embodiment of the process 1300, the wireless coverage area information may be received from an OTT client running on the first wireless device. In another embodiment of the process 1300, the wireless coverage area information may be received via an IM, a text message, a multi-media message, or an e-mail message.

With continuing reference to FIG. 13, in yet another embodiment, the process 1300 may also include sending a geo-location response to the computing device via the communication network (1308). In this embodiment, the geo-location response may include the geo-location data determined in 1306. In a further embodiment, the process 1300 may also include periodically repeating 1304 through 1308 for the first wireless device to monitor movement of the first wireless device via the computing device. In another embodiment of the process 1300, the periodic repeating of 1304 through 1308 may continue until a request cancellation is received from the computing device via the communication network. In a further embodiment, the process 1300 may also include performing 1202 through 1206 for a second wireless network. In this embodiment, the process 1300 may also include performing 1302 for the second wireless network and a second wireless device in operative communication with the communication network via the second wireless network. In the embodiment being described, the process 1300 may also include periodically repeating 1304 through 1308 for the second wireless device to monitor movement of the second wireless device via the computing device. In this embodiment, the periodic repeating for either or both of the first and second wireless devices may be based on a predetermined time interval, a change in location of the corresponding wireless device by a predetermined distance, a change in location of the corresponding wireless device by cell area for the corresponding wireless network, a change in location of the corresponding wireless device resulting in different base stations being within operative RF signaling range, a power up cycle of the corresponding wireless device, a registration cycle with the corresponding wireless network for the corresponding wireless device, a message originated by the corresponding wireless device, or a message received by the corresponding wireless device.

In another embodiment of the process 1300, the geo-location response may be sent to an OTT client running on the computing device. In yet another embodiment of the process 1300, the geo-location response may be sent via an IM, a text message, a multi-media message, or an e-mail message.

In still another embodiment of the process 1300, a wireless coverage area request may be sent to the first wireless device via the communication network in response to receiving the geo-location request in 1304. The wireless coverage area request may include a request for the wireless coverage area coordinates and signal strength values of 1304. In still yet another embodiment of the process 1300, the wireless coverage area request may be sent to an OTT client running on the first wireless device. In another embodiment of the process 1300, the wireless coverage area request may be sent via at least one of an IM, a text message, a multi-media message, or an e-mail message.

With reference to FIGS. 12 and 14, in another exemplary embodiment of a process 1400 for providing geo-location enablement for a wireless device may store geo-location information for a wireless device in response to receiving such information. The process 1400 may include 1202, 1204, and 1206 of FIG. 12. The process 1400 may also include receiving geo-location information from a plurality of wireless devices within the plurality of wireless networks via the communication network (1402). The geo-location information may include geo-location data, wireless coverage area ID data, and signal strength data. The geo-location data may include a plurality of geo-location coordinates. Each geo-location coordinate may represent an actual location of the corresponding wireless device within the corresponding coverage area of the corresponding wireless network. The wireless coverage area ID data may include a plurality of wireless coverage area coordinates. Each wireless coverage area coordinate may represent an actual cell area within the corresponding coverage area of the corresponding wireless network for which the corresponding wireless device is within operative RF signaling range of the corresponding base station. The signal strength data may include a plurality of signal strength values corresponding to the plurality of wireless coverage area coordinates. Each signal strength value may represent an actual measurement of the signal strength parameter for an RF signal received by the corresponding wireless device from the corresponding base station associated with the corresponding wireless coverage area coordinate.

At 1404, geo-location coordinates from 1402 may be stored in the geo-location enablement server as geo-location data unless the geo-location data in the geo-location enablement server already includes the geo-location coordinate. Next, wireless coverage area coordinates from 1402 may be stored in the geo-location enablement server as wireless coverage area ID data (1406). Each stored wireless coverage area coordinate may be referenced to the corresponding stored geo-location coordinate of 1404. At 1408, signal strength values from 1402 may be stored in the geo-location enablement server as signal strength data. Each stored signal strength value may be referenced to the corresponding stored wireless coverage area coordinate of 1406.

In another embodiment of the process 1400, the geo-location information may be received from an OTT client running on the wireless device. In yet another embodiment of the process 1400, the geo-location information may be received via an IM, a text message, a multi-media message, or an e-mail message.

In still another embodiment, the process 1400 may include periodically repeating 1402 through 1408 for the plurality of wireless devices. In still yet another embodiment of the process 1400, the periodic repeating of 1402 through 1408 may be based on a predetermined time interval, a change in location of the corresponding wireless device by a predetermined distance, a change in location of the corresponding wireless device by cell area for the corresponding wireless network, a change in location of the corresponding wireless device resulting in different base stations being within operative RF signaling range, a power up cycle of the corresponding wireless device, a registration cycle with the corresponding wireless network for the corresponding wireless device, a message originated by the corresponding wireless device, or a message received by the corresponding wireless device.

In another embodiment of the process 1400, the periodic repeating of 1402 through 1408 for the plurality of wireless devices may be performed to seed the geo-location data, wireless coverage area ID data, and signal strength data in the geo-location enablement server. In yet another embodiment of the process 1400, the period repeating of 1402 through 1408 for the plurality of wireless devices may be performed in a crowdsourcing manner. In other words, a plurality of users may voluntarily provision wireless devices to provide the geo-location information.

In another embodiment, the process 1400 may include sending a geo-location request to at least one wireless device via the communication network. The geo-location request may include a request for the geo-location coordinate and corresponding wireless coverage area coordinates and signal strength values of 1402. In this embodiment, the geo-location request may be sent to an OTT client running on the wireless device. In the embodiment being described, the geo-location request may be sent via at least one of an IM, a text message, a multi-media message, or an e-mail message.

In this embodiment, the process 1400 may also include periodically repeating the sending of the geo-location request and 1402 through 1408 for the at least one wireless device. In the embodiment being described, the process may include periodically repeating 1402 through 1408 for the plurality of wireless devices. In another embodiment of the process 1400, the periodic repeating of the sending of the geo-location request for either or both of the at least one wireless device and the plurality of wireless devices may be based at least in part on a predetermined time interval.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for providing geo-location enablement for a wireless device, comprising:
    storing geo-location data in a storage device within a communication network, the geo-location data comprising a plurality of geo-location coordinates;
    referencing the geo-location data for a geo-location coordinate to corresponding wireless coverage area identification data, the wireless coverage area identification data for the geo-location coordinate comprising one or more wireless coverage area coordinates, at least one of the wireless coverage area coordinates representing different sub-areas within a coverage area of a wireless network in the communication network, at least one of the sub-areas based at least in part on an operative radio frequency signaling range for a corresponding wireless access point in the wireless network, wherein the wireless coverage area identification data is stored in the storage device;
    referencing the wireless coverage area coordinate for the geo-location coordinate to corresponding signal strength data, the signal strength data for the wireless coverage area coordinate representing a signal strength value, the signal strength value representing a signal strength parameter associated with the corresponding wireless coverage area coordinate in relation to the corresponding geo-location coordinate, wherein the signal strength data is stored in the storage device; and
    receiving a geo-location request for geo-location data relating to a selected wireless device, the geo-location request being received from a computing device via the communication network.

2. The method of claim 1 wherein the wireless coverage area coordinates comprise at least one of a sub-cell identification, a cell sector identification, a media access control address, a cell identification, a location area code, a mobile network code, a mobile country code, a wireless service provider, and a wireless service operator.

3. The method of claim 1 wherein the single strength values comprise at least one of a decibel measure, a decibel measure referenced to one milliwatt, an active set updates measure, a watt measure, and a radio frequency signal power measure.

4. The method of claim 1, further comprising:
    receiving wireless coverage area information from the selected wireless device via the communication network, the wireless coverage area information comprising wireless coverage area identification data and signal strength data, the wireless coverage area identification data comprising at least one wireless coverage area coordinate, the wireless coverage area coordinate representing an actual sub-area within the coverage area of the wireless network for which the selected wireless device is within operative radio frequency signaling range of the corresponding wireless access point, the signal strength data comprising at least one signal strength value corresponding to the at least one wireless coverage area coordinate, the signal strength value representing an actual measurement of the signal strength parameter for a radio frequency signal received by the selected wireless device from the corresponding wireless access point associated with the corresponding wireless coverage area coordinate; and determining geo-location data for the selected wireless device based at least in part on matching signal strength values and corresponding wireless coverage area coordinates received from the selected wireless device to corresponding wireless coverage area identification data and signal strength data to identify corresponding geo-location data for the selected wireless device.

5. The method of claim 4 wherein the geo-location request is received via at least one of an instant message, a text message, a multi-media message, and an e-mail message.

6. The method of claim 4, further comprising:
sending a geo-location response to the computing device via the communication network, the geo-location response comprising the geo-location data determined for the selected wireless device.

7. The method of claim 6, further comprising:
periodically repeating the receiving of wireless coverage area information, determining of geo-location data, and sending of the geo-location response for the selected wireless device.

8. The method of claim 4, further comprising:
sending a wireless coverage area request to the selected wireless device via the communication network in response to receiving the geo-location request, the wireless coverage area request comprising a request for the wireless coverage area coordinates and signal strength values from the received wireless coverage area information.

9. The method of claim 1, further comprising:
receiving geo-location information from a wireless device within the wireless network via the communication network, the geo-location information comprising geo-location data, wireless coverage area identification data, and signal strength data, the geo-location data comprising a geo-location coordinate, the geo-location coordinate representing an actual location of the wireless device within the coverage area of the wireless network, the wireless coverage area identification data comprising at least one wireless coverage area coordinate, the wireless coverage area coordinate representing an actual sub-area within the coverage area of the wireless network for which the wireless device is within operative radio frequency signaling range of the corresponding wireless access point, the signal strength data comprising at least one signal strength value corresponding to the at least one wireless coverage area coordinate, the signal strength value representing an actual measurement of the signal strength parameter for a radio frequency signal received by the selected wireless device from the wireless access point associated with the corresponding wireless coverage area coordinate;

storing geo-location coordinates from the received geo-location information in the storage device as geo-location data unless the geo-location data in the storage device already includes the geo-location coordinate;

storing wireless coverage area coordinates from the received geo-location information in the storage device as wireless coverage area identification data and referencing the stored wireless coverage area coordinate to the corresponding stored geo-location coordinate; and storing signal strength values from the received geo-location information in the storage device as signal strength data and referencing the stored signal strength value to the corresponding stored wireless coverage area coordinate.

10. The method of claim 9, further comprising:
periodically repeating the receiving of the geo-location information, the storage of the geo-location coordinates, the storage of the wireless coverage area coordinates, and the storage of the signal strength value for the wireless device.

11. The method of claim 9, further comprising:
sending a geo-location request to the wireless device via the communication network, the geo-location request comprising a request for the geo-location coordinate and corresponding wireless coverage area coordinates and signal strength values.

12. The method of claim 11, further comprising:
periodically repeating the receiving of the geo-location information, the storage of the geo-location coordinates, the storage of the wireless coverage area coordinates, the storage of the signal strength value and the sending of the geo-location request for the wireless device.

13. An apparatus for providing geo-location enablement for a wireless device, comprising:
an input module configured to receive geo-location information via a communication network, the geo-location information comprising geo-location data, wireless coverage area identification data, and signal strength data;
a geo-location handling module in operative communication with the input module configured to process the geo-location data, wireless coverage area identification data, and signal strength data; and
a storage device in operative communication with the geo-location handling module configured to store the geo-location data, wireless coverage area identification data, and signal strength data, the geo-location data comprising a plurality of geo-location coordinates;
wherein the geo-location data for a geo-location coordinate is referenced to corresponding wireless coverage area identification data, the wireless coverage area identification data for the geo-location coordinate comprising one or more wireless coverage area coordinates, at least one of the wireless coverage area coordinates representing different sub-areas within a coverage area of a wireless network in the communication network, at least one of the sub-areas based at least in part on an operative radio frequency signaling range for a corresponding the wireless access point in the wireless network;
wherein the wireless coverage area coordinate for the geo-location coordinate is referenced to corresponding signal strength data, the signal strength data for the wireless coverage area coordinate representing a signal strength value, the signal strength value representing a signal strength parameter associated with the corresponding wireless coverage area coordinate in relation to the corresponding geo-location coordinate;
wherein the input module is configured to receive a geo-location request for geo-location data relating to a selected wireless device, the geo-location request being received from a computing device via the communication network.

14. The apparatus of claim 13, further comprising:
the input module configured to receive wireless coverage area information from the selected wireless device via the communication network, the wireless coverage area information comprising wireless coverage area identification data and signal strength data, the wireless coverage area identification data comprising at least one wireless coverage area coordinate, the wireless coverage area coordinate representing an actual sub-area within the coverage area of the wireless network for which the selected wireless device is within operative radio frequency signaling range of the corresponding wireless access point, the signal strength data comprising at least one signal strength value corresponding to the at least one wireless coverage area coordinate, the signal strength value representing an actual measurement of the signal strength parameter for a radio frequency signal received by the selected wireless device from the wireless access point associated with the corresponding wireless coverage area coordinate, and;

a geo-location determining module in operative communication with the input module and storage device, the geo-location determining module configured to process the geo-location request and wireless coverage area information to determine geo-location data for the selected wireless device based at least in part on matching signal strength values and corresponding wireless coverage area coordinates received in the wireless coverage area information from the selected wireless device to corresponding wireless coverage area identification data and signal strength data stored in the storage device to identify corresponding geo-location data stored in the storage device that relates to the selected wireless device.

15. The apparatus of claim 14, further comprising:
an output module in operative communication with the geo-location determining module, the output module configured to send a geo-location response to the computing device via the communication network, the geo-location response comprising the geo-location data determined by the geo-location determining module.

16. The apparatus of claim 14, further comprising:
an output module in operative communication with the geo-location determining module, the output module configured to send a wireless coverage area request to the selected wireless device via the communication network in response to the input module receiving the geo-location request, the wireless coverage area request comprising a request for wireless coverage area coordinates and corresponding signal strength values from the selected wireless device.

17. The apparatus of claim 13, further comprising:
the input module configured to receive geo-location information from a wireless device within the wireless network via the communication network, the geo-location information comprising geo-location data, wireless coverage area identification data, and signal strength data, the geo-location data comprising a geo-location coordinate representing an actual location of the wireless device within the coverage area of the wireless network, the wireless coverage area identification data comprising at least one wireless coverage area coordinate, the wireless coverage area coordinate representing an actual sub-area within the coverage area of the wireless network for which the wireless device is within operative radio frequency signaling range of the corresponding wireless access point, the signal strength data comprising at least one signal strength value corresponding to the at least one wireless coverage area coordinate, the signal strength value representing an actual measurement of the signal strength parameter for a radio frequency signal received by the wireless device from the wireless access point associated with the corresponding wireless coverage area coordinate; and the geo-location handling module configured to process the geo-location data received from the wireless device and storing the corresponding geo-location coordinates in the storage device as geo-location data unless the geo-location data in the storage device already includes the geo-location coordinate, process the wireless coverage area identification data received from the wireless device and storing the corresponding wireless coverage area coordinates in the storage device such that the stored wireless coverage area coordinate is referenced to the corresponding stored geo-location coordinate, and process the signal strength data received from the wireless device and storing the corresponding signal strength values in the storage device such that the stored signal strength value is referenced to the corresponding stored wireless coverage area coordinate.

18. The apparatus of claim 17, further comprising:
an output module in operative communication with the geo-location handling module, the output module configured to send a geo-location request to the wireless device via the communication network, the geo-location request comprising a request for the geo-location coordinate and corresponding wireless coverage area coordinates and signal strength values from the wireless device.

19. A method for providing geo-location enablement for a wireless device, comprising:
storing geo-location data in a geo-location enablement server within a communication network, the geo-location data comprising a plurality of geo-location coordinates, a geo-location coordinate comprising at least a latitude measure and a longitude measure;

referencing the geo-location data for the geo-location coordinate to corresponding wireless coverage area identification data, the wireless coverage area identification data for the geo-location coordinate comprising one or more wireless coverage area coordinates, at least one of the wireless coverage area coordinates comprising at least a cell identification, a location area code, a mobile network code, and a mobile country code, the wireless coverage area coordinates representing different cell areas within a coverage area of a particular wireless network in the communication network, at least one of the cell areas based at least in part on an operative radio frequency signaling range for a base station in the particular wireless network, wherein the wireless coverage area identification data for a plurality of wireless networks is stored in the geo-location enablement server, the wireless coverage area identification data for a wireless network comprising a plurality of wireless coverage area coordinates;

referencing the wireless coverage area coordinate for the geo-location coordinate to corresponding signal strength data, the signal strength data for the wireless coverage area coordinate representing a signal strength value, the signal strength value comprising at least one of a decibel measure referenced to one milliwatt and an active set updates measure, the signal strength value representing a signal strength parameter associated with the corresponding wireless coverage area coordinate in relation to the corresponding geo-location coordinate, wherein the signal strength data for a plurality of wireless networks is stored in the geo-location enablement server, the signal strength data for the wireless network comprising a plurality of signal strength values; and receiving a geo-location request for geo-location data relating to a selected wireless device associated with a wireless network, the geo-location request being received from a computing device via the communication network.

20. The method of claim 19, further comprising:

receiving wireless coverage area information from the selected wireless device via the communication network, the wireless coverage area information comprising wireless coverage area identification data and signal strength data, the wireless coverage area identification data comprising at least one wireless coverage area coordinate, the wireless coverage area coordinate representing an actual cell area within the coverage area of the wireless network for which the selected wireless device is within operative radio frequency signaling range of the corresponding base station in the wireless network, the signal strength data comprising at least one signal strength value corresponding to the at least one wireless coverage area coordinate, the signal strength value representing an actual measurement of the signal strength parameter for a radio frequency signal received by the selected wireless device from the corresponding base station associated with the corresponding wireless coverage area coordinate; and determining geo-location data for the selected wireless device based at least in part on matching signal strength values and corresponding wireless coverage area coordinates received from the selected wireless device to corresponding wireless coverage area identification data and signal strength data to identify corresponding geo-location data for the selected wireless device.

21. The method of claim 20, further comprising:

sending a geo-location response to the computing device via the communication network, the geo-location response comprising the geo-location data determined in for the selected wireless device.

22. The method of claim 19, further comprising:

receiving geo-location information from a plurality of wireless devices within the plurality of wireless networks via the communication network, the geo-location information comprising geo-location data, wireless coverage area identification data, and signal strength data, the geo-location data comprising a plurality of geo-location coordinates, a geo-location coordinate representing an actual location of the corresponding wireless device within the corresponding coverage area of the corresponding wireless network, the wireless coverage area identification data comprising a plurality of wireless coverage area coordinates, the wireless coverage area coordinate representing an actual cell area within the corresponding coverage area of the corresponding wireless network for which the corresponding wireless device is within operative radio frequency signaling range of the corresponding base station, the signal strength data comprising a plurality of signal strength values corresponding to the plurality of wireless coverage area coordinates, the signal strength value representing an actual measurement of the signal strength parameter for a radio frequency signal received by the corresponding wireless device from the corresponding base station associated with the corresponding wireless coverage area coordinate;

storing geo-location coordinates from the received geo-location information in the geo-location enablement server as geo-location data unless the geo-location data in the geo-location enablement server already includes the geo-location coordinate;

storing wireless coverage area coordinates from the received geo-location information in the geo-location enablement server as wireless coverage area identification data and referencing the stored wireless coverage area coordinate to the corresponding stored geo-location coordinate; and storing signal strength values from the received geo-location information in the geo-location enablement server as signal strength data and referencing the stored signal strength value to the corresponding stored wireless coverage area coordinate.

23. The method of claim 22, further comprising:

periodically repeating the receiving of the geo-location information, the storage of the geo-location coordinates, the storage of the wireless coverage area coordinates, the storage of the signal strength values for the plurality of wireless device.

24. The method of claim 23 wherein the receiving of the geo-location information, the storage of the geo-location coordinates, the storage of the wireless coverage area coordinates, and the storing of the signal strength values are periodically repeated in a crowdsourcing manner.

* * * * *